(12) United States Patent
Cui et al.

(10) Patent No.: US 12,170,851 B2
(45) Date of Patent: Dec. 17, 2024

(54) PHOTOGRAPHING METHOD, ELECTRONIC DEVICE, AND STORAGE MEDIUM

(71) Applicant: HONOR DEVICE CO., LTD., Shenzhen (CN)

(72) Inventors: Hantao Cui, Shenzhen (CN); Zuochao Zhang, Shenzhen (CN); Guangyuan Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 19 days.

(21) Appl. No.: 18/020,251

(22) PCT Filed: Dec. 31, 2021

(86) PCT No.: PCT/CN2021/144038
§ 371 (c)(1),
(2) Date: Feb. 7, 2023

(87) PCT Pub. No.: WO2022/213683
PCT Pub. Date: Oct. 13, 2022

(65) Prior Publication Data
US 2023/0276136 A1 Aug. 31, 2023

(30) Foreign Application Priority Data
Apr. 6, 2021 (CN) .......................... 202110365586.1

(51) Int. Cl.
*H04N 23/745* (2023.01)
*H04N 23/72* (2023.01)
*H04N 23/73* (2023.01)

(52) U.S. Cl.
CPC ........... *H04N 23/745* (2023.01); *H04N 23/72* (2023.01); *H04N 23/73* (2023.01)

(58) Field of Classification Search
CPC ...... H04N 23/745; H04N 23/72; H04N 23/73; H04N 23/56; H04N 23/63; H04N 23/667; H04N 23/74; H04N 23/741; H04N 23/743
See application file for complete search history.

(56) References Cited

U.S. PATENT DOCUMENTS 9,232,153 B2 1/2016 Elhachimi et al.
9,407,832 B2 8/2016 Peng
(Continued)

FOREIGN PATENT DOCUMENTS

CN 105049736 A 11/2015
CN 106131445 A 11/2016
(Continued)

*Primary Examiner* — Twyler L Haskins
*Assistant Examiner* — Angel L Garces-Rivera
(74) *Attorney, Agent, or Firm* — WOMBLE BOND DICKINSON (US) LLP

(57) ABSTRACT

Embodiments of this application provide a photographing method, an electronic device, and a storage medium, relating to the field of optical imaging technologies. The method includes: running, by the electronic device, a camera application; determining that light in a photographing scene is flickering light; acquiring an image in a first exposure manner, where the first exposure manner indicates that the electronic device performs exposures with a first exposure duration and a second exposure duration alternately; in response to a trigger to a capture button, acquiring, by the electronic device, at least one first image and at least one second image in the first exposure manner; and generating a captured image based on the first image and the second image, and displaying the captured image.

20 Claims, 10 Drawing Sheets

(56) References Cited

U.S. PATENT DOCUMENTS

| | | |
|---|---|---|
| 9,843,739 B2 | 12/2017 | Wang et al. |
| 10,404,922 B2 | 9/2019 | Hong et al. |
| 10,992,876 B2 | 4/2021 | Mangla et al. |
| 2006/0152598 A1 | 7/2006 | Kawarada |
| 2015/0312464 A1 | 10/2015 | Peng |
| 2017/0134634 A1 | 5/2017 | Jin et al. |
| 2018/0176463 A1 | 6/2018 | Shintani |
| 2018/0324344 A1 | 11/2018 | Kinoshita |
| 2020/0007737 A1 | 1/2020 | Sugawara et al. |
| 2022/0116530 A1 | 4/2022 | Zhou et al. |

FOREIGN PATENT DOCUMENTS

| | | |
|---|---|---|
| CN | 106572309 A | 4/2017 |
| CN | 106973239 A | 7/2017 |
| CN | 108322650 A | 7/2018 |
| CN | 108353130 A | 7/2018 |
| CN | 108462837 A | 8/2018 |
| CN | 109845242 A | 6/2019 |
| CN | 111163270 A | 5/2020 |
| CN | 111866401 A | 10/2020 |
| CN | 112235505 A | 1/2021 |
| CN | 112351216 A | 2/2021 |
| CN | 112383718 A | 2/2021 |
| CN | 112492227 A | 3/2021 |
| CN | 112738414 A | 4/2021 |
| JP | 2017143404 A | 8/2017 |
| JP | 2020028080 A | 2/2020 |
| KR | 20160030350 A | 3/2016 |

PHOTOGRAPHING METHOD, ELECTRONIC DEVICE, AND STORAGE MEDIUM

CROSS-REFERENCE TO RELATED APPLICATIONS

This application is a national stage of International Application No. PCT/CN2021/144038, filed on Dec. 31, 2021, which claims priority to Chinese Patent application Ser. No. 20/211,0365586.1, filed on Apr. 6, 2021. The disclosures of both of the aforementioned applications are hereby incorporated by reference in their entireties.

TECHNICAL FIELD

Embodiments of this application relate to the field of optical imaging technologies, and in particular, to a photographing method, an electronic device, and a storage medium.

BACKGROUND

A camera application runs on an electronic device. When the camera application is in a snapshot mode and a capture button on the electronic device is triggered, the electronic device may capture an image of a target object. Specifically, when the target object is in motion, the electronic device may capture an image of a motion moment of the target object. The principle is that the electronic device reduces an exposure duration using a high-speed shutter, to capture a clear image of a momentary state of the target object. It may be understood that due to the relatively short exposure duration, the electronic device requires a well-lit environment to capture the clear image of the momentary state of the target object.

When a photographing environment of the electronic device is a well-lit outdoor scene, natural light in the outdoor scene can meet an exposure requirement of the electronic device. When a photographing environment is an indoor place where light is provided by an illumination device, adequate light in the indoor place can also meet an exposure requirement of the electronic device. However, the illumination device generally operates on an alternating current. The alternating current causes the illumination device to flicker (Flicker). In other words, the alternating current affects brightness of the illumination device. As an amplitude of the alternating current changes periodically, the brightness of the illumination device changes. For example, when the illumination device operates on a 50 Hz (Hz) alternating current, the illumination device flickers 100 times per second. A camera has a relatively short exposure duration under the control of the high-speed shutter. As a result, the flickering of the illumination device affects an exposure of the electronic device and thus an exposure of an image acquired by the electronic device. This causes a flicker phenomenon in a preview image in a preview interface.

It should be noted that when the capture button on the electronic device is triggered, an image is acquired in a line-by-line exposure manner. If the exposure duration is less than a duration for which the illumination device flickers once, durations of exposures of the electronic device correspond to different phases of flickering durations. This causes inconsistent brightness of preview images continuously acquired by the electronic device and thus a flicker phenomenon in a preview image displayed on the electronic device. If the exposure duration is not an integer multiple of the duration for which the illumination device flickers once, inconsistent line-by-line exposures are caused when the capture button is triggered and the electronic device captures an image of the target object. As a result, banding (banding) appears in the image captured by the electronic device. In other words, there are stripes of different brightness in the image.

SUMMARY

This application provides a photographing method, an electronic device, and a storage medium, to eliminate a flicker phenomenon from a preview image of the electronic device in a process of capturing an image by the electronic device, and reduce a brightness difference between bright stripes and dark stripes in the image captured by the electronic device when banding appears in the image.

To achieve the foregoing technical objective, this application uses the following technical solutions:

According to a first aspect, this application provides a photographing method. The method may be applied to an electronic device with a photographing function. When the electronic device performs photographing, an illumination device provides light in a photographing scene of the electronic device. The illumination device provides flickering light. A duration for which the illumination device flickers once is a flickering duration. The method may include the following steps. The electronic device runs a camera application, and determines that the light in the photographing scene is flickering light. On this basis, the electronic device acquires an image in a first exposure manner. The first exposure manner indicates that the electronic device performs exposures with a first exposure duration and a second exposure duration alternately. The electronic device may generate a first photographing queue and a second photographing queue. The first photographing queue includes at least one first image. The second photographing queue includes at least one second image. The first photographing queue is an image acquired by the electronic device with the first exposure duration. The second photographing queue is an image acquired by the electronic device with the second exposure duration. The first exposure duration is greater than or equal to the flickering duration. The second exposure duration is less than the flickering duration.

The electronic device displays a photographing interface. The photographing interface includes a preview image and a capture button. The preview image is generated based on the image acquired in the first exposure manner. Further, in response to a trigger to the capture button, the electronic device generates a captured image based on the at least one first image and the at least one second image, and displays the captured image.

It may be understood that, the electronic device acquires images with two exposure durations. The electronic device acquires a first image with the first exposure duration and a second image with the second exposure duration.

Specifically, if a fluorescent lamp provides light when the electronic device performs photographing, flickering of the fluorescent lamp affects an image captured by the electronic device. The electronic device acquires the first photographing queue (namely, the at least one first image) corresponding to the first exposure duration and the second photographing queue (namely, the at least one second image) corresponding to the second exposure duration. For the two exposure durations, the first exposure duration is greater than the second exposure duration. The first exposure duration may be an integer multiple of the flickering duration of the illumination device. The second exposure duration is less than the flickering duration of the illumination device. In this case, as the first exposure duration is the integer multiple of the flickering duration of the illumination device, brightness of adjacent images is even in a first image stream obtained by the electronic device. If the first image stream is used as the preview image, a flicker phenomenon can be effectively eliminated from the preview image.

In another possible design of the first aspect, the first exposure duration is the integer multiple of the flickering duration. The preview image is generated based on the image acquired in the first exposure manner.

As the first exposure duration is the integer multiple of the flickering duration, exposure durations of the first images in the first photographing queue correspond to a same quantity of flickering times. Therefore, a difference between brightness values of the first images in the first photographing queue is less than a preset brightness threshold. When the electronic device uses the first photographing queue as the preview image, brightness of the preview image displayed by the electronic device is even.

In another possible design of the first aspect, when the electronic device acquires the image in the first exposure manner, the electronic device acquires the image at a first frequency.

The electronic device may acquire the image in the first photographing queue at a second frequency and acquire the image in the second photographing queue at a third frequency. A sum of the second frequency and the third frequency is equal to the first frequency.

For example, the electronic device outputs an image at a frame rate of 60 fps. Specifically, the electronic device outputs the image in the first photographing queue at a frame rate of 30 fps, and outputs the image in the second photographing queue at a frame rate of 30 fps.

In another possible design of the first aspect, that the electronic device generates a captured image based on the at least one first image and the at least one second image includes the following steps:

The electronic device determines a moment at which the capture button is triggered as a shutter moment, and determines at least one first image of which image acquisition time is close to the shutter moment in the first photographing queue. An image with the highest brightness among the at least one first image is used as a reference frame. The electronic device determines at least one second image, of which image acquisition time is close to acquisition time of the reference frame, in the second photographing queue. The electronic device uses the at least one second image as an auxiliary frame and generates the captured image based on the reference frame and the auxiliary frame.

For example, the electronic device may obtain an image log of an acquired image. The image log includes generation time of the image. The electronic device may select a first image of which generation time is close to the shutter moment.

In another possible design of the first aspect, that the electronic device generates a captured image based on the at least one first image and the at least one second image includes the following steps:

The electronic device determines a moment at which the capture button is triggered as a shutter moment, and determines at least one first image of which image acquisition time is close to the shutter moment in the first photographing queue. An image with the highest brightness among the at least one first image is used as a reference frame. The electronic device determines at least one second image, of which image acquisition time is close to acquisition time of the reference frame, in the second photographing queue. The electronic device determines an image with the highest brightness among the at least one second image as an auxiliary frame, and generates the captured image based on the reference frame and the auxiliary frame.

In another possible design of the first aspect, that the electronic device generates the captured image based on the reference frame and the auxiliary frame includes the following steps.

The electronic device determines a first threshold of the reference frame based on banding detection. The first threshold indicates a banding level of the reference frame. If the first threshold is greater than a preset threshold, the electronic device generates the captured image based on the auxiliary frame. If the first threshold is less than or equal to a preset threshold, the electronic device generates the captured image based on the reference frame and the auxiliary frame.

In another possible design of the first aspect, that if the first threshold is less than or equal to a preset threshold, the electronic device generates the captured image based on the reference frame and the auxiliary frame includes the following steps.

The electronic device determines a non-motion area and a motion area in the reference frame. The non-motion area is a part, in which a motionless object is located, of the image. The motion area is a part, in which a target object is located, of the image. The electronic device performs pixel fusion on the non-motion area based on the auxiliary frame to reduce banding in the non-motion area, and generates a processed non-motion area. The electronic device adjusts a gray level coefficient of the motion area to reduce banding in the motion area, and generates a processed motion area. The electronic device fuses, by using an image fusion algorithm, the processed motion area and the processed non-motion area to generate the captured image.

In another possible design of the first aspect, that if the first threshold is greater than a preset threshold, the electronic device generates the captured image based on the auxiliary frame includes the following step: The electronic device processes, by using a preset image deblurring algorithm, the auxiliary frame to reduce motion blur of the auxiliary frame and generate the captured image.

In another possible design of the first aspect, that the electronic device runs a camera application, and determines that the light in the photographing scene is flickering light includes the following steps.

The electronic device runs the camera application, and acquires an image in a second exposure manner. The second exposure manner indicates that the electronic device performs an exposure with a third exposure duration. The electronic device continuously acquires a plurality of images, and calculates brightness of each of the plurality of images. If a brightness difference between every two of the plurality of images is greater than a preset brightness difference, the electronic device determines that the light in the photographing scene is flickering light.

In another possible design of the first aspect, the method further includes the following step: If the electronic device detects a change to the photographing scene, the electronic device acquires an image in a second exposure manner. The second exposure manner indicates that the electronic device performs an exposure with a third exposure duration.

In another possible design of the first aspect, after the electronic device detects the change to the photographing scene, the method further includes the following steps: The electronic device determines an exposure manner switching delay. After the switching delay ends, the electronic device switches from the first exposure manner to the second exposure manner.

In another possible design of the first aspect, the third exposure duration is equal to the first exposure duration, or the third exposure duration is equal to the second exposure duration.

According to a second aspect, this application further provides an electronic device. The electronic device includes: a camera, configured to acquire an image; and a display screen, configured to display an interface. When the electronic device performs photographing, an illumination device provides light in a photographing scene of the electronic device. The illumination device provides flickering light. A duration for which the illumination device flickers once is a flickering duration. The electronic device further includes: one or more processors, a memory, and one or more computer programs. The one or more computer programs are stored in the memory. The one or more computer programs include instructions. When the instructions are executed by the electronic device, the electronic device is enabled to implement the following method.

The electronic device runs a camera application, and determines that the light in the photographing scene is flickering light. On this basis, the electronic device acquires an image in a first exposure manner. The first exposure manner indicates that the electronic device performs exposures with a first exposure duration and a second exposure duration alternately. The electronic device may generate a first photographing queue and a second photographing queue.

The first photographing queue includes at least one first image. The second photographing queue includes at least one second image. The first photographing queue is an image acquired by the electronic device with the first exposure duration. The second photographing queue is an image acquired by the electronic device with the second exposure duration. The first exposure duration is greater than or equal to the flickering duration. The second exposure duration is less than the flickering duration.

The electronic device displays a photographing interface. The photographing interface includes a preview image and a capture button. The preview image is generated based on the image acquired in the first exposure manner. Further, in response to a trigger to the capture button, the electronic device generates a captured image based on the at least one first image and the at least one second image, and displays the captured image.

In another possible design of the second aspect, the first exposure duration is an integer multiple of the flickering duration. The preview image is generated based on the image acquired in the first exposure manner.

As the first exposure duration is the integer multiple of the flickering duration, exposure durations of the first images in the first photographing queue correspond to a same quantity of flickering times. Therefore, a difference between brightness values of the first images in the first photographing queue is less than a preset brightness threshold. When the electronic device uses the first photographing queue as the preview image, brightness of the preview image displayed by the electronic device is even.

In another possible design of the second aspect, when the electronic device acquires the image in the first exposure manner, the electronic device acquires the image at a first frequency.

The electronic device may acquire the image in the first photographing queue at a second frequency and acquire the image in the second photographing queue at a third frequency. A sum of the second frequency and the third frequency is equal to the first frequency.

In another possible design of the second aspect, the electronic device generates the captured image based on the at least one first image and the at least one second image. In this case, the electronic device is further configured to perform the following operations. The electronic device determines a moment at which the capture button is triggered as a shutter moment, and determines at least one first image of which image acquisition time is close to the shutter moment in the first photographing queue. An image with the highest brightness among the at least one first image is used as a reference frame. The electronic device determines at least one second image, of which image acquisition time is close to acquisition time of the reference frame, in the second photographing queue. The electronic device uses at least one second image as an auxiliary frame and generates the captured image based on the reference frame and the auxiliary frame.

In another possible design of the second aspect, the electronic device generates the captured image based on the at least one first image and the at least one second image. In this case, the electronic device is further configured to perform the following operations. The electronic device determines a moment at which the capture button is triggered as a shutter moment, and determines at least one first image of which image acquisition time is close to the shutter moment in the first photographing queue. An image with the highest brightness among the at least one first image is used as a reference frame. The electronic device determines at least one second image, of which image acquisition time is close to acquisition time of the reference frame, in the second photographing queue. The electronic device determines an image with the highest brightness among the at least one second image as an auxiliary frame, and generates the captured image based on the reference frame and the auxiliary frame.

In another possible design of the second aspect, the electronic device generates the captured image based on the reference frame and the auxiliary frame. In this case, the electronic device specifically performs the following operations. The electronic device determines a first threshold of the reference frame based on banding detection. The first threshold indicates a banding level of the reference frame. If the first threshold is greater than a preset threshold, the electronic device generates the captured image based on the auxiliary frame. If the first threshold is less than or equal to a preset threshold, the electronic device generates the captured image based on the reference frame and the auxiliary frame.

In another possible design of the second aspect, if the first threshold is less than or equal to the preset threshold, the electronic device generates the captured image based on the reference frame and the auxiliary frame. In this case, the electronic device is specifically configured to perform the following operations. The electronic device determines a non-motion area and a motion area in the reference frame. The non-motion area is a part, in which a motionless object is located, of the image. The motion area is a part, in which a target object is located, of the image. The electronic device performs pixel fusion on the non-motion area based on the auxiliary frame to reduce banding in the non-motion area, and generates a processed non-motion area. The electronic device adjusts a gray level coefficient of the motion area to reduce banding in the motion area, and generates a processed motion area. The electronic device fuses, by using an image fusion algorithm, the processed motion area and the processed non-motion area to generate the captured image.

In another possible design of the second aspect, if the first threshold is greater than the preset threshold, the electronic device generates the captured image based on the auxiliary frame. In this case, the electronic device is specifically configured to perform the following operation: The electronic device processes, by using a preset image deblurring algorithm, the auxiliary frame to reduce motion blur of the auxiliary frame and generate the captured image.

In another possible design of the second aspect, the electronic device runs the camera application, and determines that the light in the photographing scene is flickering light. In this case, the electronic device is specifically configured to perform the following operations: The electronic device runs the camera application, and acquires an image in a second exposure manner. The second exposure manner indicates that the electronic device performs an exposure with a third exposure duration. The electronic device continuously acquires a plurality of images, and calculates brightness of each of the plurality of images. If a brightness difference between every two of the plurality of images is greater than a preset brightness difference, the electronic device determines that the light in the photographing scene is flickering light.

In another possible design of the second aspect, the electronic device is further configured to perform the following operation: If the electronic device detects a change to the photographing scene, the electronic device acquires an image in a second exposure manner. The second exposure manner indicates that the electronic device performs an exposure with a third exposure duration.

In another possible design of the second aspect, after the electronic device detects the change to the photographing scene, the electronic device is further configured to perform the following operations: The electronic device determines an exposure manner switching delay. After the switching delay ends, the electronic device switches from the first exposure manner to the second exposure manner.

In another possible design of the second aspect, the third exposure duration is the first exposure duration, or the third exposure duration is the second exposure duration.

According to a third aspect, this application further provides an electronic device. The electronic device includes: a camera, configured to acquire an image; a display screen, configured to display an interface; one or more processors; a memory; and one or more computer programs. The one or more computer programs are stored in the memory. The one or more computer programs include instructions. When the instructions are executed by the electronic device, the electronic device is enabled to perform the photographing method according to the first aspect and any one of the possible designs of the first aspect.

According to a fourth aspect, this application further provides a computer-readable storage medium. The computer-readable storage medium includes computer instructions. When the computer instructions are run on a computer, the computer is enabled to perform the photographing method according to the first aspect and any one of the possible designs of the first aspect.

According to a fifth aspect, an embodiment of this application provides a computer program product. When the computer program product runs on a computer, the computer is enabled to perform the method performed by the electronic device according to the first aspect and any one of the possible designs of the first aspect.

According to a sixth aspect, an embodiment of this application provides a chip system. The chip system is applied to an electronic device. The chip system includes one or more interface circuits and one or more processors. The interface circuit and the processor are connected to each other through lines. The interface circuit is configured to receive a signal from a memory of the electronic device and send the signal to the processor. The signal includes computer instructions stored in the memory. When the processor executes the computer instructions, the electronic device is enabled to perform the method according to the first aspect and any one of the possible designs of the first aspect.

It may be understood that, for beneficial effects to be achieved by the electronic device according to the second aspect, the electronic device according to the third aspect, the computer-readable storage medium according to the fourth aspect, the computer program product according to the fifth aspect, and the chip system according to the sixth aspect provided in this application, reference may be made to the beneficial effects in the first aspect and any one of the possible designs of the first aspect. Details are not described herein again.

DESCRIPTION OF EMBODIMENTS

The terms "first" and "second" mentioned below are used merely for description, and shall not be construed as an indication or implication of relative importance or an implicit indication of a quantity of indicated technical features. Therefore, a feature limited by "first" or "second" may explicitly or implicitly include one or more of the features. In the descriptions of embodiments, "a plurality of" means two or more, unless otherwise specified.

An embodiment of this application provides a photographing method. The method may be applied to an electronic device. When the electronic device captures an image, a display screen of the electronic device may display a preview image in real time. Brightness of an image in a preview image stream can be even, and a flicker phenomenon can be eliminated from the preview image. When a capture button of the electronic device is triggered, the electronic device may capture a clear image of the target object, so that when banding appears in the image captured by the electronic device, a brightness difference can be reduced between bright stripes and dark stripes in the image.

Figure 1:
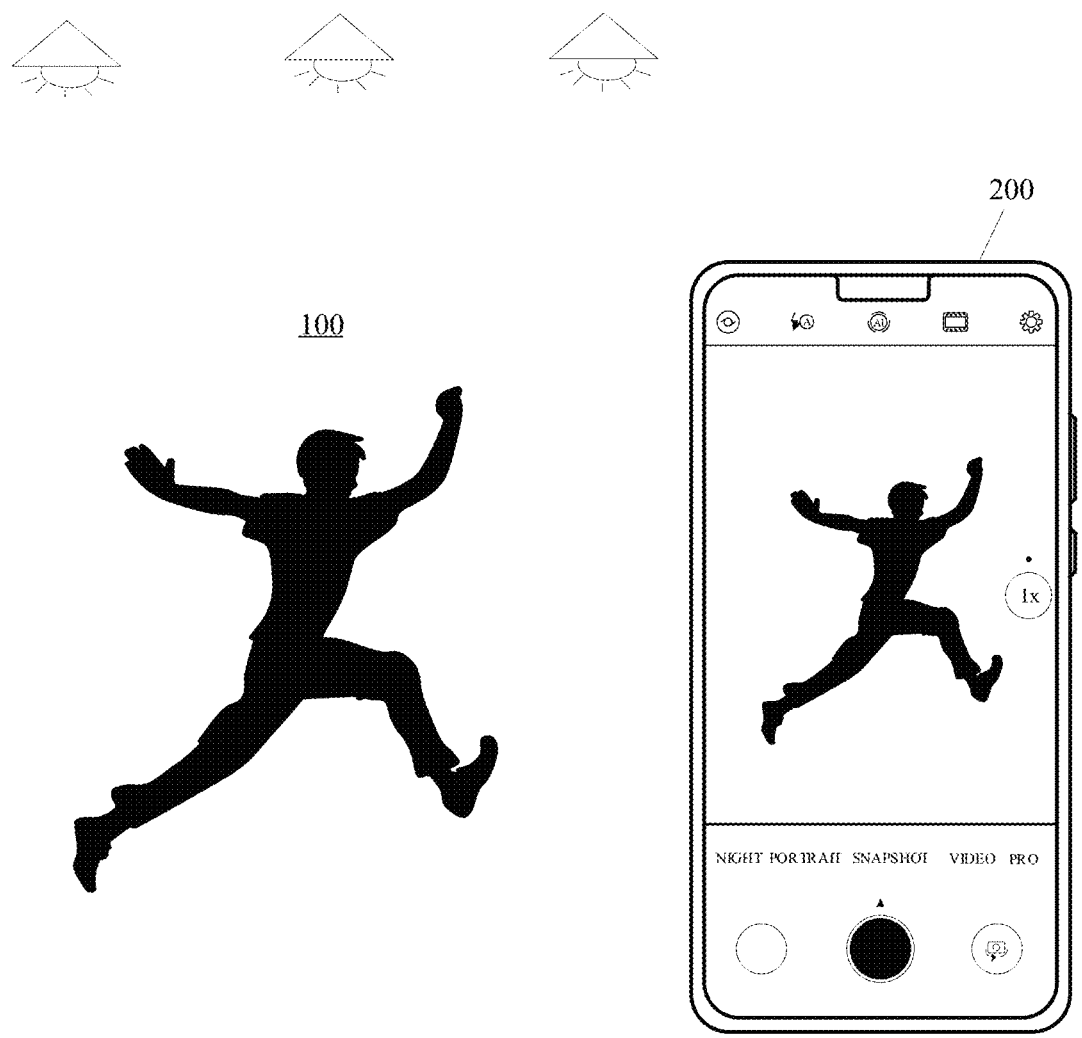
FIG. 1 is a schematic diagram of a photographing scene according to an embodiment of this application.

FIG. 1 is a schematic diagram of a scenario of the photographing method according to the embodiment of this application. As shown in FIG. 1, a target object 100 is in motion in an indoor place where an indoor illumination device (an electric lamp) provides light. An electronic device 200 runs a camera application. In a process in which the electronic device 200 captures an image of the target object, a display screen of the electronic device 200 may display a preview image of the target object 100 in real time. When a user is viewing the preview image on the display screen of the electronic device 200, the user may tap a capture control on a photographing interface to capture an image of a motion moment of the target object. When a capture button of the electronic device 200 is triggered, the electronic device 200 may capture the image of the motion moment of the target object.

It may be understood that, the target object may be a person, or may be an animal, a vehicle, a robot, or the like. An example in which the target object is a person is used in this embodiment of this application. For example, the target object being in motion in an indoor place may be a person playing badminton or table tennis, or practicing yoga indoors. A target object in a photographing view of the electronic device may be one or more persons.

In addition, an illumination device provides light in the indoor place. The illumination device may operate on an alternating current. For example, the illumination device is a fluorescent lamp. The fluorescent lamp works on the following principle: A noble gas inside a lamp tube discharges at a high-voltage current, electrons generated by the discharge reach the lamp tube of the fluorescent lamp, and then the fluorescent lamp emits light. For example, the fluorescent lamp operates on a 50 Hz alternating current. When operating on the alternating current, the fluorescent lamp flickers 100 times in one second on the 50 Hz alternating current. In other words, a duration for which the fluorescent lamp flickers once is $1/100$ s.

It may be understood that, when the electronic device is in a photography mode, a display screen of the electronic device may display a preview image. When a capture button of the electronic device is triggered, the electronic device generates a snapped image (also referred to as a captured image). The same is a process in which the electronic device captures an image of a motion moment of the target object. The flickering of the fluorescent lamp affects an image acquired by an image sensor. If improper exposure time is set, a flicker phenomenon may occur in an image in a preview image stream, or banding may appear in an image acquired by the electronic device.

The former case occurs as follows: The electronic device generates a preview image stream and displays the preview image stream on the display screen to form a preview image, so that the user may view the preview image on the display screen. If an exposure duration set by the electronic device is less than the duration for which the fluorescent lamp flickers once (for example, an image is acquired with an exposure duration of $1/50$ s), exposures of images obtained by the electronic device in a preview image stream include different quantities of flickering times. As a result, the images obtained by the electronic device in the preview image stream differ in brightness. When the electronic device displays the preview image stream, a brightness difference between two images may cause the user to perceive a change in brightness of the display screen of the electronic device. This is referred to as a flicker phenomenon.

Figure 2:
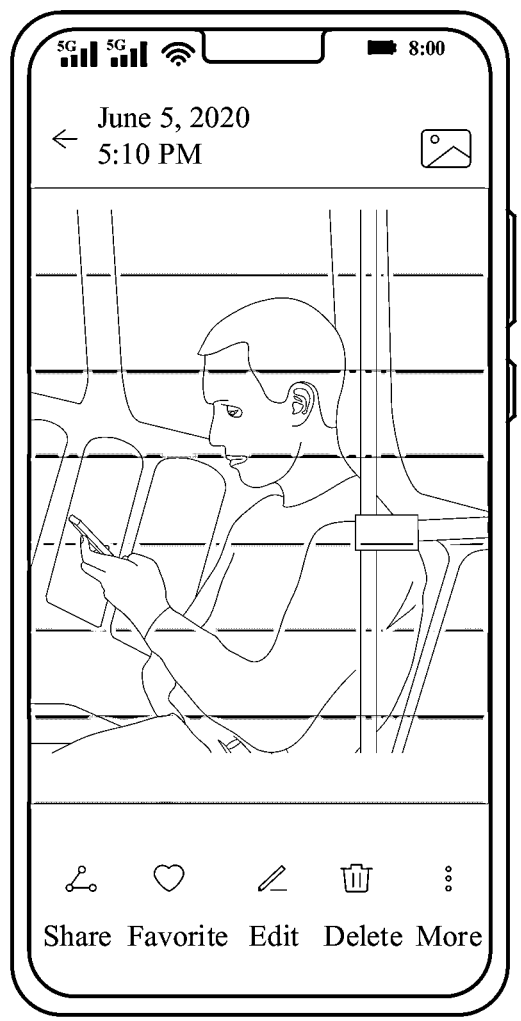
FIG. 2 is a schematic diagram of a captured image according to an embodiment of this application.

The latter case occurs as follows: When the capture button of the electronic device is triggered and the electronic device generates the captured image, the image sensor acquires an image in a line-by-line exposure manner. In a process in which the image sensor acquires the image through line-by-line exposure, the flickering of the fluorescent lamp causes different exposures of different lines in one image. As a result, there are bright stripes and dark stripes, that is, banding in the image generated by the electronic device. FIG. 2 shows an image with banding. There are bright stripes and dark stripes in the image due to a change in brightness during exposure.

Figure 3:
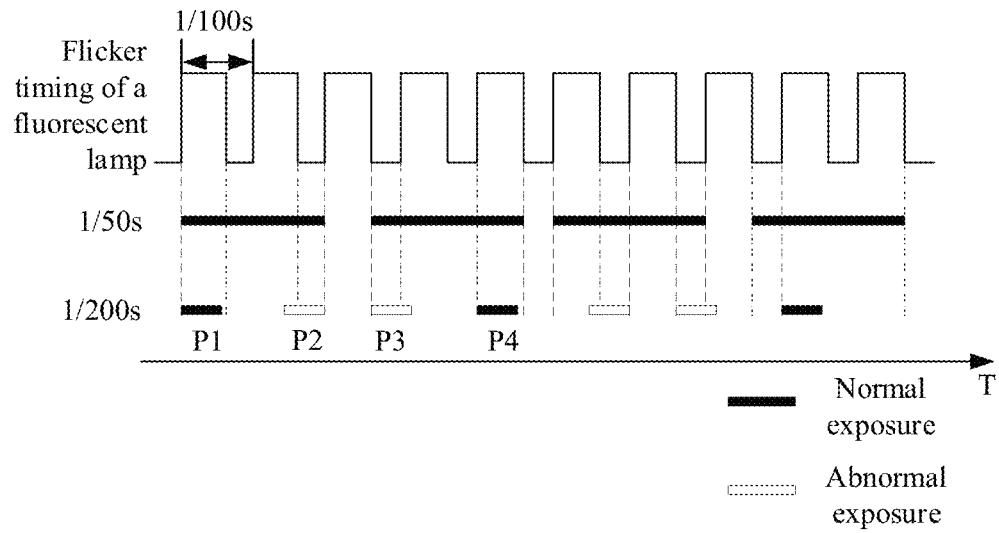
FIG. 3 is a diagram of exposure timing according to an embodiment of this application.

For example, FIG. 3 shows exposure conditions of images acquired by the electronic device with different exposure durations. An exposure duration of $1/50$ s and an exposure duration of $1/200$ s are used as examples to describe the exposure conditions of the images acquired by the electronic device. As shown in FIG. 3, the duration for which the fluorescent lamp flickers once is $1/100$ s. In a timing diagram of the fluorescent lamp, a moment corresponding to a rising edge is a moment at which the fluorescent lamp starts lighting, and a moment corresponding to a falling edge is a moment at which the fluorescent lamp stops lighting. The rising edge indicates a moment at which a change from a low level to a high level occurs. The falling edge indicates a moment at which a change from a high level to a low level occurs.

When the electronic device acquires images with the exposure duration of $1/50$ s, the exposure duration is twice the duration for which the fluorescent lamp flickers once. In other words, the fluorescent lamp flickers once for the exposure duration. Consequently, the images acquired after exposures are identical in brightness. In this case, the images each are a normally-exposed image, and the images are identical in brightness. When the electronic device acquires images with the exposure duration of $1/200$ s, the exposure duration is half of the duration for which the fluorescent lamp flickers once. In other words, if the fluorescent lamp is in an illumination duration during exposure, a pixel can be exposed normally; or if the fluorescent lamp is in a non-illumination duration during exposure, a pixel cannot be exposed normally. An image generated when the pixel cannot be exposed normally is an abnormally-exposed image.

For example, four exposures are performed with a second exposure duration. A corresponding image is acquired in each time of exposure. P1 is an image obtained after the first exposure. A duration of the first exposure corresponds to only an illumination time period of the flickering of the fluorescent lamp. The image P1 obtained after the exposure is a normally-exposed image. P2 is an image obtained after the second exposure. A duration of the second exposure corresponds to both an illumination time period of the flickering of the fluorescent lamp and a non-illumination time period of the fluorescent lamp. The image P2 obtained after the exposure is an abnormally-exposed image. P3 is an image obtained after the third exposure. A duration of the third exposure corresponds to both an illumination time period of the flickering of the fluorescent lamp and a non-illumination time period of the fluorescent lamp. During line-by-line exposure, colors of a pixel exposed in the non-illumination time period of the fluorescent lamp cannot be acquired. Therefore, the image P3 obtained after the exposure is an abnormally-exposed image. P4 is an image obtained after the fourth exposure. A duration of the fourth exposure corresponds to only an illumination time period of the flickering of the fluorescent lamp. As the image P4 is in the same condition as the image P1, the image P4 obtained after the exposure is a normally-exposed image.

It should be understood that, the exposure duration of $1/200$ s is an exposure duration for all pixels. In other words, when line-by-line exposures are performed with the exposure duration, the pixels are exposed with constant time. For example, in the case of the exposure duration of $1/50$ s, the exposure time of the pixels includes a same quantity of flickering times. This indicates that the pixels are exposed with the same amount of light. Therefore, the images acquired are normally-exposed images.

It may be seen that setting of an exposure duration affects quality of a preview image and a captured image in the photography mode.

In a first implementation, the image sensor of the electronic device is configured to output a frame at a high frame rate, to eliminate a flicker phenomenon from a preview image when the electronic device is in the photography mode. For example, an exposure duration is set to $1/200$ s, and the image sensor is configured to output image frames at a rate of 120 fps (frame per second). The electronic device caches a captured image stream. Brightness fusion is performed on each image, its previous image, and its following image, so that brightness of the image is the same as brightness of the previous image and brightness of the following image. After all the images are processed in this way, the images in the image stream are identical in brightness. This reduces flicker phenomena in the images in the image stream.

Further, the electronic device performs frame extraction on an image stream. For example, the electronic device performs frame extraction on the 120 fps image stream, to obtain a 30 fps image stream. Then, the electronic device displays the 30 fps image stream, so that the user may view a preview image on the electronic device.

To eliminate the flicker phenomenon from the preview image in this manner, a preview image stream of a high frame rate needs to be acquired. This limits exposure time of each image. An increase in a frame rate for outputting frames may cause larger noise in an image. This affects a display effect of the preview image. Meanwhile, when the image sensor operates at the high frame rate, a resolution of an acquired image is limited. It should be noted that images acquired by existing image sensors each have a resolution less than or equal to 1080P. If the high frame rate is used for outputting frames, the electronic device cannot capture an image of high resolution.

In a second implementation, an image algorithm may be used to reduce banding in an image captured by the electronic device. It should be understood that there is no specific algorithm for eliminating banding from an image. Generally, the banding in the image may be reduced by adjusting a gamma (Gamma) curve in a camera or adjusting a local tone mapping (local tone mapping) manner of the image sensor. However, either of the foregoing two processing manners causes a decrease in contrast in the image captured by the electronic device. This affects a display effect of the image.

In an exemplary processing manner, longer exposure time may be used to reduce an effect of the flickering of the fluorescent lamp on the image. For example, an exposure duration is set to an integer multiple of $1/100$ s. In this case, no banding appears in an image acquired for the exposure duration.

However, when banding is eliminated in this manner, the target object is still in motion during exposure due to the longer exposure duration. As a result, there is a motion blur image of the target object on a generated image, and an image of a motion moment of the target object cannot be captured. In other words, the image of the target object is not clear in the captured image.

In a third implementation, when the electronic device generates a high dynamic range (High-Dynamic Range, HDR) image and an HDR video, overlapped exposures are performed with a plurality of exposure durations to extend dynamic ranges of the image and the video. Corresponding image streams are obtained with the different exposure durations. For example, overlapped exposures are performed with three exposure durations to generate a long-frame image, a medium-frame image, and a short-frame image. The electronic device synthesizes the long-term image, the medium-frame image, and the short-frame image by using an ISP, to form an HDR image.

When the electronic device obtains an HDR video in this manner in a place where the fluorescent lamp provides light, the flickering of the fluorescent lamp also affects a captured image, causing banding to appear in an image in a short-frame image stream. This affects a display effect of an HDR image.

In a fourth implementation, when the electronic device is a digital camera, banding can be eliminated from an image by using a mechanical shutter. Under the control of the mechanical shutter, all pixels in the image sensor may be exposed simultaneously, but not line by line. This exposure manner can eliminate the banding from the image.

However, the mechanical shutter needs to be added to the electronic device to implement this manner. This may increase a size of a camera module and thus a size of the electronic device. What's worse, this manner may increase costs of the electronic device.

On this basis, an embodiment of this application provides a photographing method. The method in this embodiment of this application may be applied to capture a momentary state of a target object, to effectively eliminate a flicker phenomenon from a preview image and eliminate banding from a snapped image that is generated.

For example, sports games such as a basketball game and a swimming race are held in indoor places. When a user watches the basketball game, the user may use an electronic device to capture wonderful moments during the game.

For another example, activities such as an outdoor parent-child activity and an outdoor soccer game are held in outdoor places. When there is inadequate sunlight outside, an illumination device is used to provide light. In this case, an electronic device may be used to capture wonderful moments during the activity or the game.

According to the method provided in this embodiment of this application, an exposure manner corresponding to a snapshot mode involves two exposure durations. Exposures are performed with the two exposure durations alternately. The electronic device may obtain image streams corresponding to the exposure durations. The electronic device may store images acquired with the exposure durations. The images may be used to generate a preview image and generate a snapped image in response to a trigger to a capture button.

It may be understood that, the electronic device acquires a first image stream (namely, a plurality of first images) corresponding to a first exposure duration and a second image stream (namely, a plurality of second images) corresponding to a second exposure duration. For the two exposure durations, the first exposure duration is greater than the second exposure duration. The first exposure duration may be an integer multiple of a flickering duration of an illumination device. The second exposure duration is less than the flickering duration of the illumination device. In this case, as the first exposure duration is the integer multiple of the flickering duration of the illumination device, brightness of adjacent images is even in the first image stream obtained by the electronic device. If the first image stream is used as the preview image, a flicker phenomenon can be effectively eliminated from the preview image.

Specifically, the electronic device can directly display the first image stream as the preview image. Alternatively, the electronic device can generate a preview image stream based on a first image stream and a second image stream that are obtained after real-time processing, and displays the preview image stream on a display screen. The images in the second image stream are of higher definition. Therefore, a high-quality preview image may be obtained after de-banding and deblurring are performed on the images in the first image stream and the images in the second image stream. This improves quality of the preview image stream displayed by the electronic device, and provides the user with a good preview experience.

When the capture button receives the trigger, the electronic device may process an image corresponding to a moment at which the capture button is triggered in the second image stream, to obtain a snapped image and display the snapped image. Alternatively, when the capture button receives the trigger, the electronic device may process a first image and a second image that correspond to a moment at which the capture button is triggered, to obtain a snapped image and display the snapped image. The second exposure duration is less than a duration for which a fluorescent lamp flickers once. As a result, the images in the second image stream are of higher definition. The image in the second image stream is used as a reference frame. The image in the first image stream is used as an auxiliary frame. The auxiliary frame and the reference frame are used for an image processing algorithm, to generate a snapped image without banding and with a relatively high definition.

Figure 4:
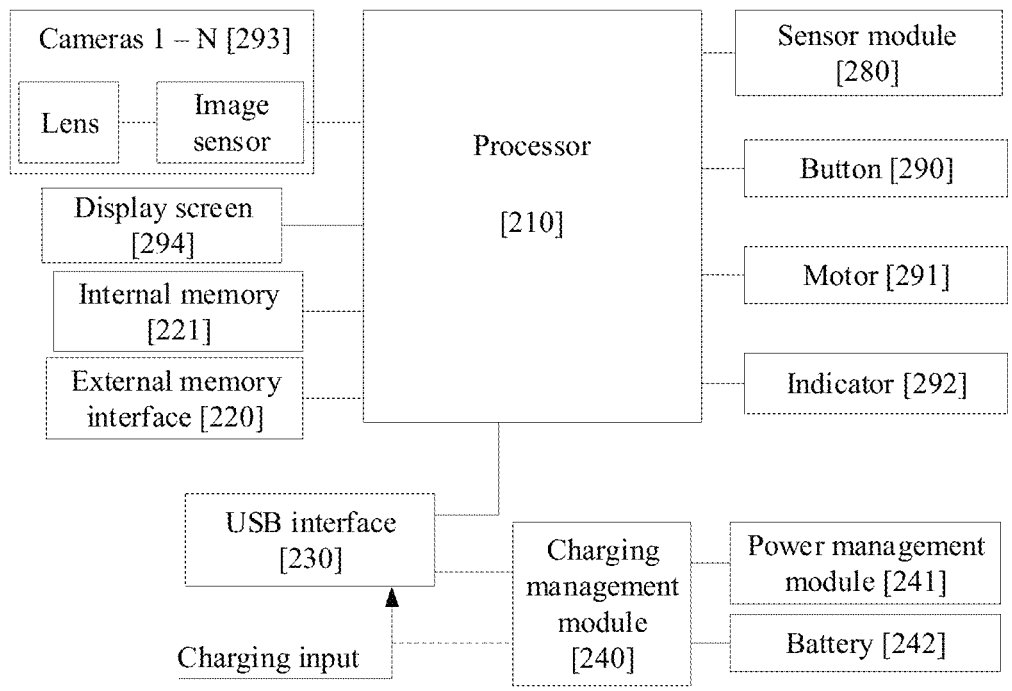
FIG. 4 is a schematic structural diagram of an electronic device according to an embodiment of this application.

FIG. 4 is a schematic structural diagram of an electronic device according to an embodiment of this application.

As shown in FIG. 4, an electronic device 200 may include a processor 210, an external memory interface 220, an internal memory 221, a universal serial bus (universal serial bus, USB) interface 230, a charging management module 240, a power management module 241, a battery 242, a sensor module 280, a button 290, a motor 291, an indicator 292, a camera 293, a display screen 294, and the like. The sensor module 280 may include a pressure sensor, a gyro sensor, an acceleration sensor, a distance sensor, an optical proximity sensor, a temperature sensor, a touch sensor, an ambient light sensor, and the like.

It may be understood that, a structure shown in this embodiment of this application does not constitute a specific limitation on the electronic device 200. In some other embodiments of this application, the electronic device 200 may include more or fewer components than those shown in the figure, or some components may be combined, or some components may be split, or different component arrangements may be used. The components shown in the figure may be implemented by hardware, software or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components or may be integrated into one or more processors.

The controller may be a nerve center and a command center of the electronic device 200. The controller may generate an operation control signal based on instruction operation code and a timing signal, to implement control of instruction fetching and instruction execution.

The processor 210 may further be provided with a memory. The memory is configured to store an instruction and data. In some embodiments, the memory in the processor 210 is a cache memory. The memory may store an instruction or data recently used or repeatedly used by the processor 210. If the processor 210 needs to use the instruction or the data again, the processor 210 may directly invoke the instruction or the data from the memory. This avoids repeated storage and reading, and reduces a waiting time of the processor 210, thereby improving system efficiency.

In some embodiments, the processor 210 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), and/or a general-purpose input/output (general-purpose input/output, GPIO) interface.

It may be understood that, an interface connection relationship between the modules shown in this embodiment of this application is merely an example for description, and does not constitute a limitation on the structure of the electronic device 200. In some other embodiments of this application, the electronic device 200 may alternatively use an interface connection manner different from that in the foregoing embodiment, or a combination of a plurality of interface connection manners.

The charging management module 240 is configured to receive a charging input from a charger. The charger may be a wireless charger or a wired charger.

The power management module 241 is configured to connect the battery 242, the charging management module 240, and the processor 210. The power management module 241 receives an input of the battery 242 and/or an input of the charging management module 240, and supplies power to the processor 210, the internal memory 221, an external memory, the display screen 294, the camera 293, and the like. The power management module 241 may be further configured to monitor parameters such as a battery capacity, a battery cycle count, and a battery health state (leakage or impedance).

The electronic device 200 implements a display function by using the GPU, the display screen 294, the application processor, and the like. The GPU is a microprocessor for image processing, and is connected to the display screen 294 and the application processor. The GPU is configured to perform mathematical and geometric calculations and render graphics. The processor 210 may include one or more GPUs. The one or more GPUs execute program instructions to generate or change display information.

The display screen 294 is configured to display an image, a video, and the like. The display screen 294 includes a display panel. The display panel may be formed by a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Mini LED, a Micro LED, a Micro-OLED, a quantum dot light-emitting diodes (quantum dot light emitting diodes, QLED), or the like. In some embodiments, the electronic device 200 may include one or N display screens 294. N is a positive integer greater than 1.

The electronic device 200 may implement a photographing function by using the ISP, the camera 293, the video codec, the GPU, the display screen 294, the application processor, and the like.

The ISP is configured to process data fed back by the camera 293. For example, when the electronic device performs photographing, a shutter is open. Light is transmitted to an image sensor of the camera through a lens, so that an optical signal is converted into an electrical signal. The image sensor of the camera transfers the electrical signal to the ISP for processing, so that the electrical signal is converted into an image visible to naked eyes. The ISP may also optimize noise, brightness, and skin tone of the image by using algorithms. The ISP may also optimize parameters such as exposure and a color temperature of a photographing scene. In some embodiments, the ISP may be disposed in the camera 293.

The camera 293 is used to capture a still image or a video. An optical image of an object is generated by using the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293. N is a positive integer greater than 1.

The digital signal processor is configured to process digital signals, including a digital image signal and other digital signals. For example, when the electronic device 200 selects a frequency, the digital signal processor is configured to perform Fourier transform on frequency energy.

The external memory interface 220 may be configured to connect to an external storage card, for example, a Micro SD card, to expand a storage capacity of the electronic device 200. The external storage card communicates with the processor 210 through the external memory interface 220, to implement a data storage function. For example, the external storage card stores files such as music and a video.

The internal memory 221 may be configured to store computer-executable program code. The executable program code includes instructions. The processor 210 runs the instructions stored in the internal memory 221, to execute various function applications and data processing of the electronic device 200. The internal memory 221 may include a program storage area and a data storage area. The program storage area may store an operating system, an application required for at least one function (for example, a sound playback function or an image display function), and the like. The data storage area may store data (for example, audio data and an address book) created during use of the electronic device 200, and the like. In addition, the internal memory 221 may be a high-speed random access memory or a non-volatile memory, for example, at least one magnetic disk memory, a flash memory, or a universal flash storage (universal flash storage, UFS).

The button 290 includes a power on/off button, a volume button, and the like. The button 290 may be a mechanical button or a touch button. The electronic device 200 may receive a button input and generate a button signal input related to user settings and function control of the electronic device 200.

The motor 291 may generate vibrating alerts. The motor 291 may be configured to provide vibration alerts for an incoming call, and may also be configured to provide vibration feedback for a touch. For example, touch operations that act on different applications (such as photographing and audio playback) may correspond to different vibration feedback effects. In response to touch operations performed on different areas of the display screen 294, the motor 291 may provide different vibration feedback effects.

The indicator 292 may be an indicator lamp. The indicator 292 may be configured to indicate a charging state and a power change, and may also be configured to indicate a message, a missed call, a notification, and the like.

A software system of the electronic device 200 may use a hierarchical architecture, an event-driven architecture, a micronucleus architecture, a microservice architecture, or a cloud architecture. It should be noted that in the embodiments of this application, an operating system of the electronic device may be, but is not limited to, the Symbian® (Symbian) operating system, the Android® (Android) operating system, the Windows® operating system, the iOS® (iOS) operating system, the Blackberry® (Blackberry) operating system, the HarmonyOS (Harmony) operating system, and the like. This is not limited in this application.

In this embodiment of this application, the Android system with a hierarchical architecture is used as an example to describe a software architecture of the electronic device 200.

Figure 5:
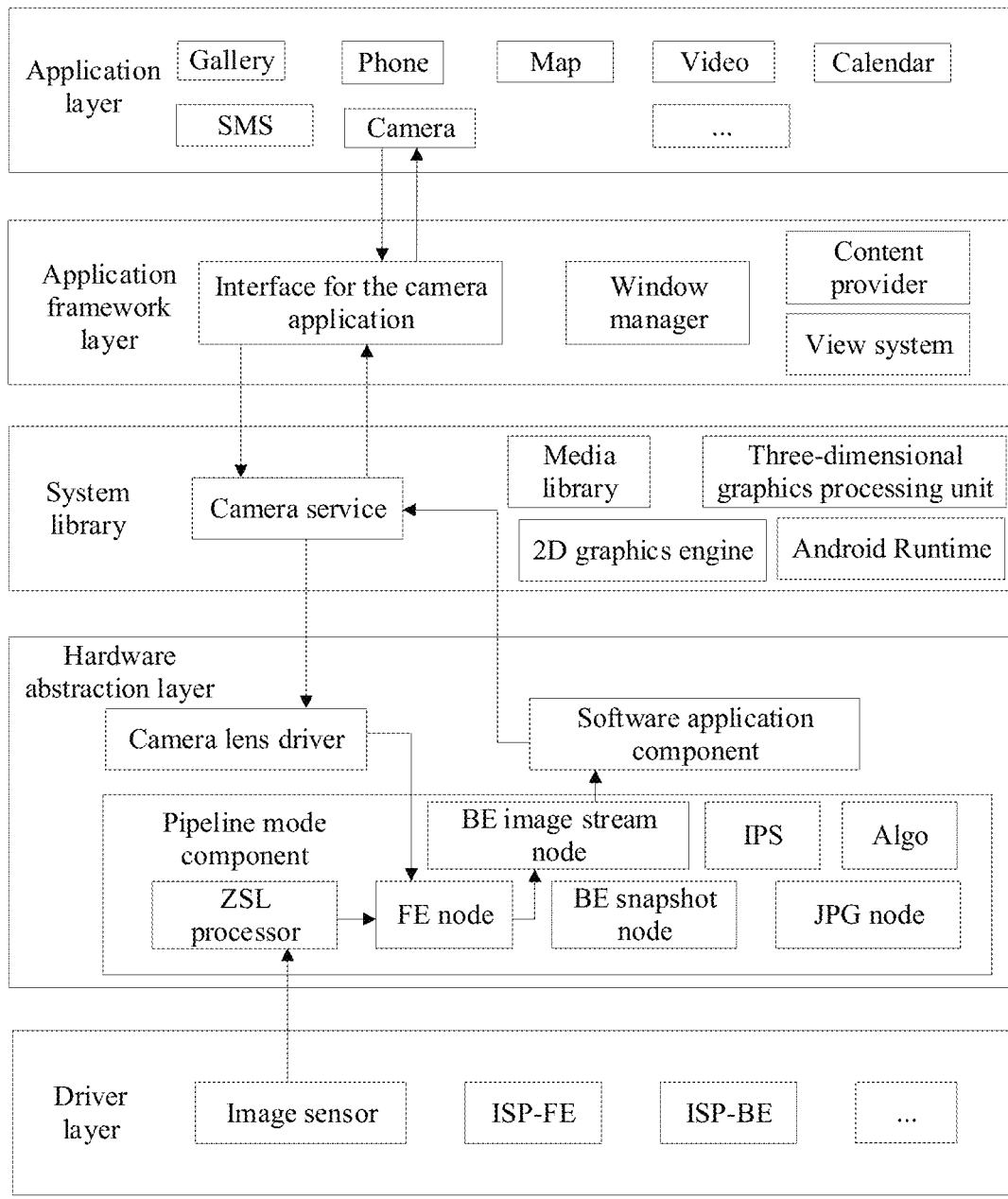
FIG. 5 is a schematic diagram of a system architecture of an electronic device according to an embodiment of this application.

FIG. 5 is a block diagram of the software architecture of the electronic device 200 according to an embodiment of this application.

In a hierarchical architecture, software is divided into several layers, each of which has a clear role and task. Communication between the layers is performed through a software interface. In some embodiments, the Android system is divided into five layers: an application layer, an application framework layer, Android Runtime (Android runtime) and a system library, a hardware abstraction layer, and a driver layer from top to bottom.

The application layer may include a series of application packages.

As shown in FIG. 5, the application packages may include applications such as Camera, Gallery, Calendar, Phone, Map, Video, and SMS.

The application framework layer provides an application programming interface (application programming interface, API) and a programming framework for the application at the application layer. The application framework layer includes some predefined functions.

As shown in FIG. 5, the application framework layer may include an interface for the camera application, a window manager, a content provider, a view system, and the like.

The window manager is configured to manage a window application. The window manager may obtain a size of the display screen, determine whether there is a status bar, perform screen locking, and take a screenshot.

The content provider is configured to store and obtain data, and make the data accessible to the application. The data may include a video, an image, audio, calls that are made and answered, a browsing history and a bookmark, a phone book, and the like.

The view system includes visual controls such as a control for displaying text and a control for displaying a picture. The view system may be configured to construct an application. A display interface may include one or more views. For example, a display interface with a SMS notification icon may include a view for displaying text and a view for displaying a picture.

The Android Runtime includes core libraries and a virtual machine. The Android Runtime is responsible for scheduling and management of the Android system.

The core libraries include two parts: functions to be invoked by the Java language, and core libraries of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, such as a camera service, a media library (Media Libraries), a three-dimensional graphics processing library (for example, OpenGL ES), and a 2D graphics engine (for example, SGL).

The media library supports a plurality of common audio and video formats for playback and recording, as well as still image files. The media library may support a plurality of audio and video coding formats, such as MPEG-4, H.164, MP3, AAC, AMR, JPG, and PNG.

The three-dimensional graphics processing library is configured to implement three-dimensional graphics drawing, image rendering, synthesis, layer processing, and the like.

The 2D graphics engine is a drawing engine for 2D drawings.

With reference to the photographing method provided in this application, the following describes a working procedure of the electronic device 200 by using an example. The system architecture shown in FIG. 5 is used as an example to describe a photographing procedure of the electronic device 200.

As shown in FIG. 5, the hardware abstraction layer includes a camera component (Camera Device3), an image pipeline (Image Pipeline) mode component, and a software application component (Image Stream Callback MGR). The driver layer includes an image sensor (sensor), a frond end (Front End, ISP-FE) node of an image processing unit, a back end (Back End, ISP-BE) node of the image processing unit, and the like.

The camera application in the application layer may be displayed on a screen of the electronic device in the form of an icon. When the icon of the camera application is triggered, the electronic device runs the camera application. The camera application runs on the electronic device. The electronic device may send, based on an operation of a user, a corresponding touch event to a kernel layer. The kernel layer converts the touch event into a raw input event. The raw input event is stored at the kernel layer. When a touch screen receives the touch event, the camera application is started. Then, the kernel layer is called to start a camera. In response to the operation of the user, the electronic device enters a snapshot mode of the camera application.

As shown in FIG. 5, an image pipeline includes a zero shutter lag processor (zero shutter lag Manager, ZSL Manager), an FE node, a BE-streaming back end image stream node (Node), a BE-snapshot back end snapshot node (Node), the Internet Protocol Suite (Internet Protocol Suite, IPS) (or understood as a pipeline filtering model in a pipeline mode), a memory carrying a platform algorithm, and the like.

The ZSL processor is configured to provide a preview image when the camera application is run. The ZSL processor is disposed in a container for a historical frame of a raw domain image. The ZSL manager may be configured to manage a preview image stream obtained with ZSL, and may perform configuration, queueing, frame selection, and other operations on the preview image stream.

The FE node is a root node of the pipeline mode, that is, an original node of processing of all images acquired by the electronic device. The FE node may be used as a front-end processor of a hardware ISP chip.

The back end image stream node (BE-Streaming-Node) is configured to process preview image streams, for example, a preview image stream generated when the electronic device is in the snapshot mode and a preview image stream generated when the electronic device is in a video recording state. In some embodiments, the IPS may be mounted to the back end image stream node. That is, the back end image stream node may access a preview image processed by the ISP. Mounting is a process by which the operating system allows the electronic device to access files on a storage device.

The back end snapshot node (BE-Snapshot-Node) is configured to process a snapshot-related image. For example, the back end snapshot node generates a snapped image based on a first image and a second image. In some embodiments, the IPS may be mounted to the back end snapshot node. That is, the back end snapshot node may access a snapshot image processed by the ISP.

The IPS is a pipeline filtering model of the HAL layer. A plug-in may be configured in the IPS, and the plug-in may be configured to access an algorithm stored in the storage device. After the IPS accesses the algorithm, the IPS may be configured to take over data of camera preview, data of a camera photographing action, data generated in the video recording mode, and the like. In some embodiments, the IPS may interact with a framework layer of a camera and the HAL to implement corresponding functions.

Algo is a module for an image processing algorithm, and may be mounted to the IPS. In some embodiments, Algo may include an algorithm processing module. When Algo calls the algorithm processing module to run the algorithm, Algo can access processors such as a CPU, a GPU, and an NPU.

The image sensor (sensor) is configured to acquire an image, is responsible for a power-on or power-off timing diagram of a hardware sensor, and may be further configured to implement functions of matching control and real-time image sensor configuration and reset. The image sensor may be configured to implement a manner in which exposures are performed alternately with two exposure durations corresponding to an exposure manner in the snapshot mode.

For example, the electronic device is in the snapshot mode of the camera application. The camera application calls a corresponding interface at the application framework layer. The kernel layer is called to start a camera driver and then the camera of the electronic device. An image is acquired by using the camera. In the exposure manner corresponding to the snapshot mode, exposures are performed with a first exposure duration and a second exposure duration alternately. The camera of the electronic device performs the exposures in the exposure manner corresponding to the snapshot mode, and the image sensor acquires an image. The ZSL manager stores a first image stream corresponding to the first exposure duration and a second image stream corresponding to the second exposure duration. The FE node in the electronic device may process the first image stream in the ZSL manager to generate a preview image stream. The electronic device displays the preview image stream. When a capture button (or a capture control) of the electronic device receives a trigger, the BE-snapshot node generates a snapped image based on a first image (an auxiliary frame) and a second image (a reference frame), and displays the snapped image on the display screen.

It should be noted that, the electronic device in the embodiments of this application may be a device with a photographing function, such as a mobile phone, an action camera (for example, GoPro), a digital camera, a tablet computer, a desktop computer, a laptop computer, a handheld computer, a notebook computer, an in-vehicle device, an ultra-mobile personal computer (ultra-mobile personal computer, UMPC), a netbook, a cellular phone, a personal digital assistant (personal digital assistant, PDA), or an augmented reality (augmented reality, AR) or virtual reality (virtual reality, VR) device. A specific form of the electronic device is not particularly limited in the embodiments of this application.

Figure 6:
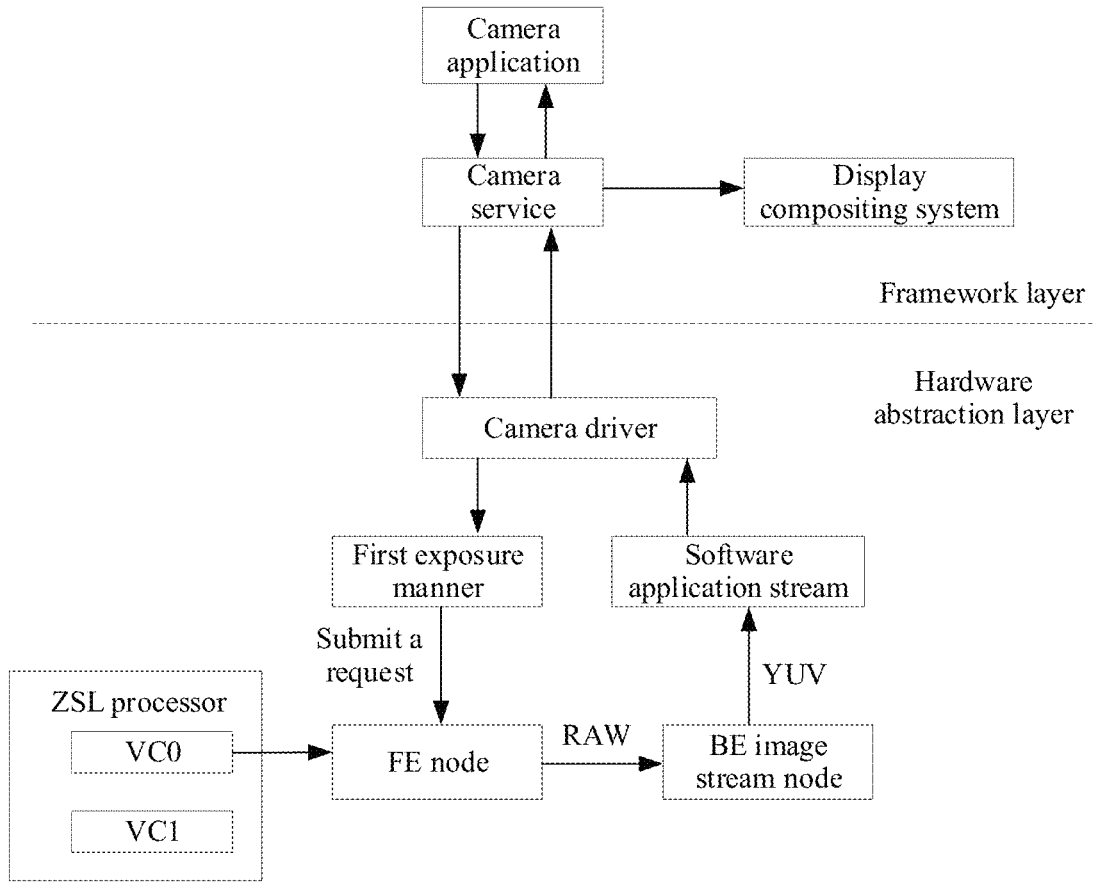
FIG. 6 is a block diagram of interaction between a hardware abstraction layer and a framework layer according to an embodiment of this application.

For example, the electronic device has a snapshot mode. When the electronic device is in the snapshot mode, the electronic device may perform exposures with the first exposure duration and the second exposure duration alternately (that is, in a first exposure manner) to acquire an image. FIG. 6 shows a procedure in which the electronic device generates a snapped image.

As shown in FIG. 6, the photographing procedure of the electronic device is performed between a hardware abstraction layer and a framework layer. The framework (framework) layer includes a camera application (APP1), a camera service (camera service), and a display compositing system (for example, surface flinger). The hardware abstraction layer (HAL) includes a camera driver 3 (camera device3), the first exposure manner, a software application stream (APP Stream), an FE Node, a BE-streaming back-end image stream node (Node), and a ZSL processor.

When the camera application is triggered, the camera application sends a camera running request, where a photography mode of the camera application is the snapshot mode. Then, the camera service at the framework layer is triggered, and a camera driver corresponding to a camera at the hardware abstraction layer is started. The camera driver invokes the first exposure manner. The first exposure manner submits a photographing request to the FE node. Two photographing queues, namely, VC0 and VC1 are in the ZSL processor. The first exposure manner indicates that the electronic device performs exposures with the first exposure duration and the second exposure duration alternately. An image acquired by the electronic device with the first exposure duration constitutes the photographing queue VC0. An image acquired by the electronic device with the second exposure duration constitutes the photographing queue VC1.

A procedure in which the electronic device displays a preview image is used as an example. The FE node transmits the acquired photographing queues to the BE-streaming back-end image stream node. The ZSL processor transmits the image queue VC0 to an image pipeline. The image pipeline transmits the image queue to the framework layer by using the software application stream. Then, the framework layer receives feedback data from the hardware abstraction layer, and displays an image on the display screen by using the display compositing system.

The method in the following embodiments may all be implemented in an electronic device having the foregoing hardware structure.

Figure 7:
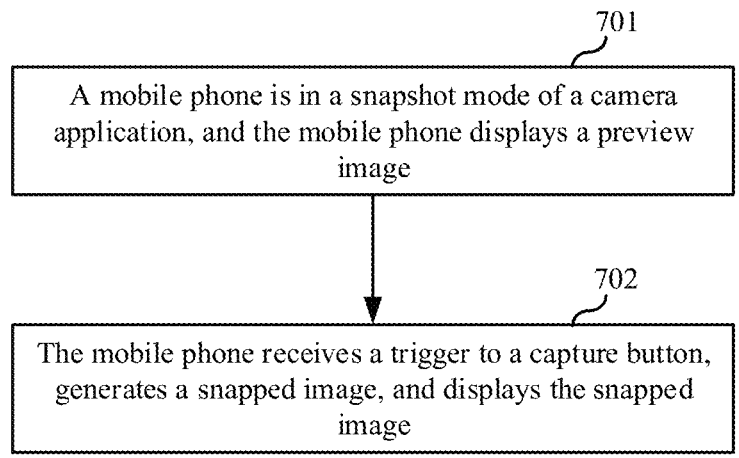
FIG. 7 is a flowchart of a photographing method according to an embodiment of this application.

In this embodiment of this application, an example in which the electronic device is a mobile phone is used. A camera application is installed in the mobile phone. FIG. 7 is a flowchart of a photographing method according to an embodiment of this application. As shown in FIG. 7, the method includes step 701 and step 702.

The mobile phone runs the camera application, and captures an image in a snapshot mode of the camera application. In this embodiment of this application, the photographing method provided in the embodiments of this application is described by using an example in which an illumination device provides light in a photographing scene and the mobile phone captures an image in the snapshot mode of the camera.

It should be noted that, in the snapshot mode of the camera, an image is obtained only in a first exposure manner. The snapshot mode may not be set in the camera in actual use. When the mobile phone detects that a fluorescent lamp provides light in the current photographing scene and the light provided by the fluorescent lamp is flickering light, the electronic device obtains an image in the snapshot mode (that is, in the first exposure manner).

Step 701: The mobile phone is in the snapshot mode of the camera application, and the mobile phone displays a preview image.

It should be noted that, when the mobile phone runs the camera application, the came application may include a plurality of photography modes. Images obtained in different photography modes have different effects. For example, the camera application includes a portrait mode, a snapshot mode, a night mode, and the like. In an image obtained in the portrait mode, facial features of a person are prominent. In an image obtained in the snapshot mode, an action at a motion moment of a target object can be captured. An image obtained in the night mode is of high definition. Each of the modes is used in a corresponding scenario. In this embodiment of this application, the snapshot mode is used as an example to describe the photographing method provided in the embodiments of this application. It may be understood that, the photographing method is not only applicable to the snapshot mode.

Figure 8:
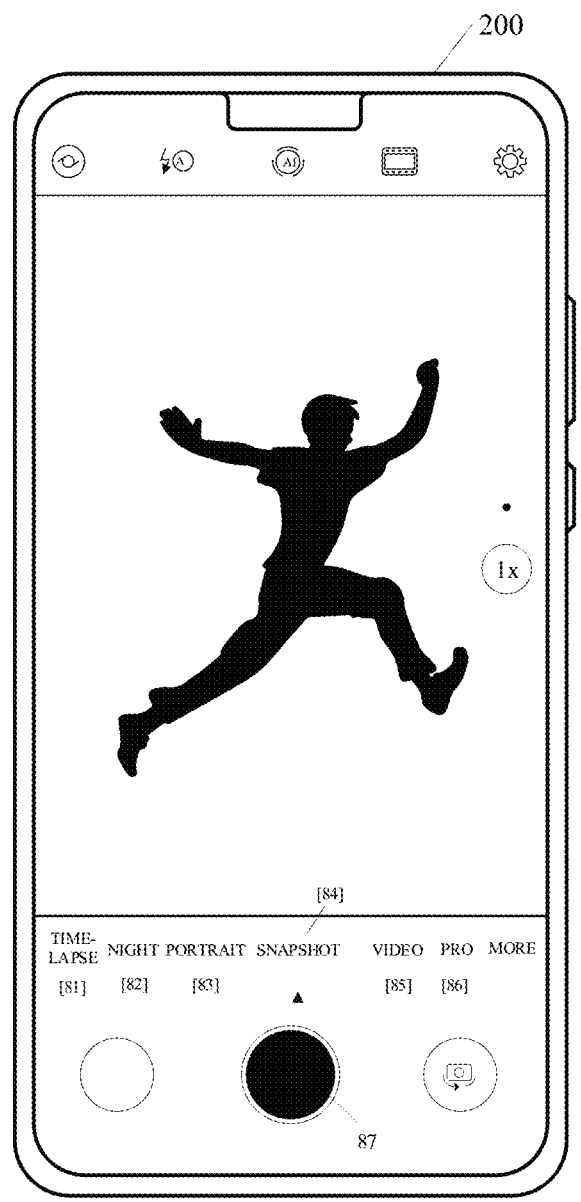
FIG. 8 is a schematic diagram of a display interface in a photography mode according to an embodiment of this application.

For example, when the mobile phone runs the camera application, the mobile phone displays a photographing interface shown in FIG. 8. The photographing interface includes a plurality of photography modes of the camera application, such as a time-lapse photography mode 81, a night photography mode 82, a portrait photography mode 83, a snapshot photography mode 84, a video photography mode 85, and a professional photography mode 86. A capture button 87 indicates a current photography mode. As shown in FIG. 8, the capture button 87 indicates that the current photography mode is the snapshot photography mode 84.

In the snapshot mode, when the mobile phone photographs a target object, the mobile phone generates an image of a motion moment of the target object. When the mobile phone is in the snapshot mode of the camera application, the mobile phone performs an exposure in the exposure manner corresponding to the snapshot mode. In this exposure manner, exposures are performed with a first exposure duration and a second exposure duration alternately. The first exposure duration is greater than the second exposure duration.

It may be understood that, in a process in which the mobile phone acquires an image in the exposure manner of the snapshot mode, the exposures are performed with the first exposure duration and the second exposure duration alternately, so that the mobile phone may acquire two image streams. The first exposure duration corresponds to a first image stream. The second exposure duration corresponds to a second image stream.

Figure 9:
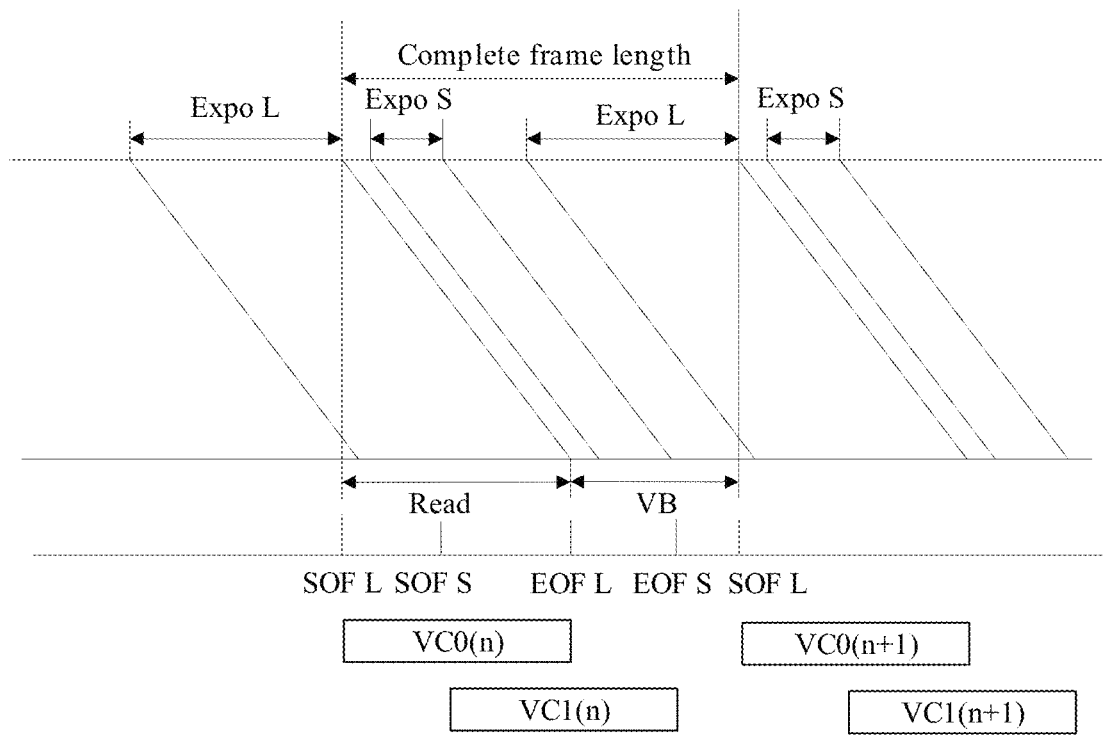
FIG. 9 is a schematic diagram of image acquisition in an exposure manner corresponding to a snapshot mode according to an embodiment of this application.

For example, FIG. 9 shows the exposure manner of the snapshot mode used by the mobile phone. As shown in FIG. 9, Expo L represents the first exposure duration; Expo S represents the second exposure duration; SOF L represents a moment at which readout of a frame image starts after an exposure with the first exposure duration; EOF L represents a moment at which the readout of the frame image ends after the exposure with the first exposure duration; SOF S represents a moment at which readout of a frame image starts after an exposure with the second exposure duration; and EOF S represents a moment at which the readout of the frame image ends after the exposure with the second exposure duration.

As shown in FIG. 9, the mobile phone may read out a first image (namely, an image in a first photographing queue) corresponding to the first exposure duration from the moment SOF L to the moment EOF L. In other words, a duration between the moment SOF L and the moment EOF L is a readout duration of one first image. The mobile phone may read out a second image (namely, an image in a second photographing queue) corresponding to the second exposure duration from the moment SOF S to the moment EOF S. In other words, a duration between the moment SOF S to the moment EOF S is a readout duration of one second image. When exposures are performed with the first exposure duration, a duration between a moment at which readout of a first image ends and a moment at which readout of a following image starts is vertical blank (Vertical Blank, VB) between the two images. A duration between the moment at which the readout of the first image starts and the moment at which the readout of the second image ends is a duration for which the mobile phone acquires one first image and one second image. Alternatively, the duration is referred to as a complete frame length.

Specifically, the first exposure duration is 1/50 s, and the second exposure duration is 1/200 s. Exposures are performed with the two exposure durations alternately. One image is acquired in each time of exposure. The first exposure duration corresponds to a long exposure image stream VC0. The second exposure duration corresponds to a short exposure image stream VC1. The mobile phone displays the long exposure image stream VC0 as a preview image, to eliminate a flicker phenomenon from the preview image.

For example, the mobile phone obtains a first photographing queue VC0. The mobile phone displays the first photographing queue VC0 as a preview image. For another example, the mobile phone uses a second photographing queue VC1 as a reference frame. The mobile phone processes each image in the second photographing queue VC1 based on an image in the first photographing queue VC0, to generate a preview image, and displays the preview image on the display screen of the mobile phone.

Step 702: The mobile phone receives a trigger to a capture button, generates a snapped image, and displays the snapped image.

It may be understood that, VC0 and VC1 acquired with the foregoing exposure durations are still used as an example in the following description. A high-speed shutter is disposed in the mobile phone. When the high-speed shutter is triggered, the mobile phone captures an image of a motion moment of the target object.

Specifically, when the capture button of the mobile phone is triggered, the mobile phone caches a reference frame. The reference frame is an effectively-exposed image acquired with the second exposure duration. Further, the mobile phone caches at least one auxiliary frame. The auxiliary frame is an image acquired with the first exposure duration. The mobile phone performs image processing based on the at least one auxiliary frame and the reference frame, to obtain the snapped image. The mobile phone displays the snapped image. In this way, a user may view the snapped image on the mobile phone.

In some implementations, the mobile phone may obtain an exposure duration and ISO of each image from an image log (ISP LOG) in an ISP.

Two rounds of consecutive exposures are used as an example. A log of an image acquired by the mobile phone with the first exposure duration in a first round of exposures is 07-15 10:11:34.534 [974.717864] [cpu0] [I/FW] <fast_scheduie_hdr_merge_core_exec,218>iso_frame.

A log of an image acquired by the mobile phone with the second exposure duration in the first round of exposures is 07-15 10:11:34.534 [974.717864] [cpu0] [I/FW] <fast_scheduie_hdr_merge_core_exec,218>100,100.

A log of an image acquired by the mobile phone with the first exposure duration in a second round of exposures is 07-15 10:11:34.534 [974.717895] [cpu0] [I/FW] <fast_scheduie_hdr_merge_core_exec,219>expo_frame.

A log of an image acquired by the mobile phone with the second exposure duration in the second round of exposures is 07-15 10:11:34.534 [974.717895] [cpu0] [I/FW] <fast_scheduie_hdr_merge_core_exec,218>10000,2500.

It may be understood that, the mobile phone may use the first image stream as a preview image stream, to avoid flickers in the preview image. The processor processes the acquired first image stream and displays a processed first image stream as the preview image.

For example, when the mobile phone acquires an image with the first exposure duration, the mobile phone may output the image at a frame rate of 60 frame per second (f/s). With the first exposure duration, the mobile phone may output the first image stream at a frame rate of 30 frame per second (f/s). With the second exposure duration, the mobile phone may also output the second image stream at a frame rate of 30 frame per second (f/s). A ZSL processor may prepare two cache areas to cache the first image stream and the second image stream.

In the first exposure manner, exposures are performed with the first exposure duration and the second exposure duration alternately. As a result, the first exposure duration and the second exposure duration correspond to a same frame rate for outputting frames.

Specifically, when the mobile phone receives the trigger to the capture button, the mobile phone may generate the snapped image based on a historical frame image cached in the ZSL processor and an image acquired by the mobile phone at a moment when the capture button is triggered.

It should be understood that, when the mobile phone receives the trigger to the capture button, the target object captured by the mobile phone is making an amazing movement, or an amazing movement of the target object has happened. This is a shutter lag phenomenon. The mobile phone may generate the snapped image based on the historical frame cached by the ZSL manager, to ensure that the mobile phone can capture the amazing movement of the target object at the moment of receiving the trigger to the capture button. When the mobile phone selects the historical frame image in the ZSL processor, the mobile phone may select an image frame cached by the mobile phone at a moment of shutter exposure or an image frame cached by the mobile phone before a moment of shutter exposure.

The second exposure duration is relatively short. Therefore, the mobile phone may capture a clear image of the motion moment of the target object. However, as the second exposure duration is less than a duration for which the illumination device flickers once, the reference frame cached by the mobile phone may be unevenly exposed. The mobile phone may use an image frame in the first image stream acquired with the first exposure duration as a reference frame, and perform exposure processing on an image frame in the second image stream, to eliminate uneven exposure of the image frame in the second image stream. For example, the mobile phone may select a frame VC1(n) from VC1 cached by the ZSL as a reference frame, use an image previous to VC1(n) and an image following VC1(n) (namely, VC1(n−1) and VC1(n+1)) as auxiliary frames, and select an image frame (for example, VC0(n)), of which a timestamp is closest to that of VC1(n), from VC0. The mobile phone processes VC0(n), the reference frame and the auxiliary frames, to generate a snapped image. After the mobile determines the reference frame, the mobile phone may select at least two images from an image frame previous to the reference frame and an image frame following the reference frame as the auxiliary frames.

It may be understood that, the cached image frames that are selected may be transmitted from an FE node to a BE node, and the image frames each are converted from an original raw domain image to an image in a YUV format (an image format). As a result, the mobile phone may process the cached images that are selected, to generate the snapped image.

Figure 10:
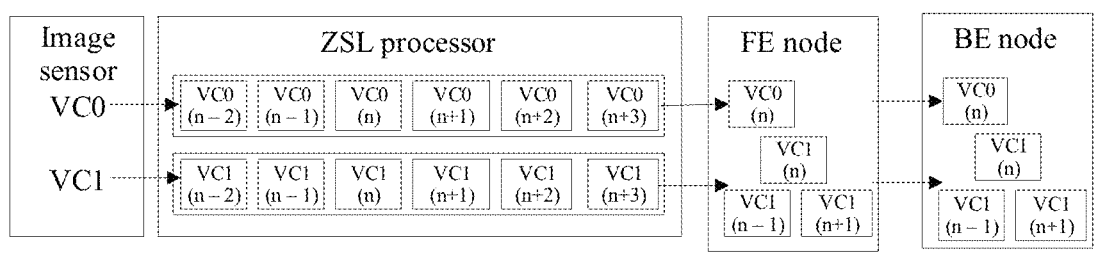
FIG. 10 is a schematic diagram of image processing for generating a snapped image by an electronic device in a photographing method according to an embodiment of this application.

FIG. 10 shows a procedure in which the mobile phone generates the snapped image based on the first image stream and the second image stream. As shown in FIG. 10, an image sensor in the mobile phone performs exposures with the first exposure duration and the second exposure duration alternately. An image acquired by the image sensor is cached in the ZSL processor. As shown in FIG. 10, the ZSL processor caches six images of VC0 and six images of VC1. It is assumed that, the capture button of the mobile phone is triggered, and the mobile phone detects that an amazing movement of the target object has happened. The mobile phone may select VC1(n) from VC1 as a reference frame, and use VC1(n−1) and VC1(n+1) as auxiliary frames. The mobile phone may further select an image VC0(n), of which a timestamp is closest to that of VC1(n), from VC0. The mobile phone performs de-banding on VC1(n) based on VC0(n), VC1(n−1) and VC1(n+1), and performs deblurring (deblur) and other image processing operations to remove noise from the image. In this way, quality of the image is improved. Then, the mobile phone generates a snapped image. Images in the FE node are raw domain images. Images in the BE node are images in the YUV format.

In the foregoing process, when the mobile phone enters the snapshot mode of the camera application, a log is Cam/HBC: [acquireBufferSets] rRequiredStreams: Image (0): Meta(0).

After the mobile phone is in the snapshot mode and displays preview images for a period of time, the ZSL processor caches images corresponding to the first exposure duration and the second exposure durationA corresponding log in this case is: I Cam/HBC: [getAvailableRequestList] total(14) cv 0 available(7): [0:98]; [1:100]; [2:102]; [3:104]; [4:106]; [5:108]; [6:110]; cv1 available(7):[0:99]; [1:101]; [2:103]; [3:105]; [4:107]; [5:109]; [6:111]. cv 0 available(7) corresponds to the cached images in the first image stream. cv1 available(7) corresponds to the cached images in the second image stream.

It may be understood that, the capture button of the mobile phone is triggered, and the mobile phone may read out some of the cached images from the ZSL. A corresponding log in this case is I Cam/Zs1Mgr: [selectBuf Locked]-: Get enough buffer from HBC (reqFrameSz_cv1:3, reqFrameSz_cv0:1,,req:40, policy:0x30001).

The ZSL processor receives a request to read the cached images, but the request is pending. A corresponding log in this case is I Cam/Zs1Mgr: [operator( )] [submitZs1Request] [requestNo:113]: successfully process pending request (reqNo:40).

A log corresponding to the ZSL processor outputting the corresponding cached images is remove from pending list [pendingSz(0)].

For example, when the mobile phone is in the snapshot mode of the camera application, the mobile phone may first detect light in the photographing scene. Then, the mobile phone may determine whether there is a flickering illumination device providing light in the photographing scene of the mobile phone. If there is no flickering illumination device providing light in the photographing scene, the mobile phone may obtain a snapped image in an exposure manner with one exposure duration. If there is a flickering illumination device providing light in the photographing scene, the mobile phone may obtain a snapped image in the foregoing exposure manner with the first exposure duration and the second exposure duration.

Figure 11:
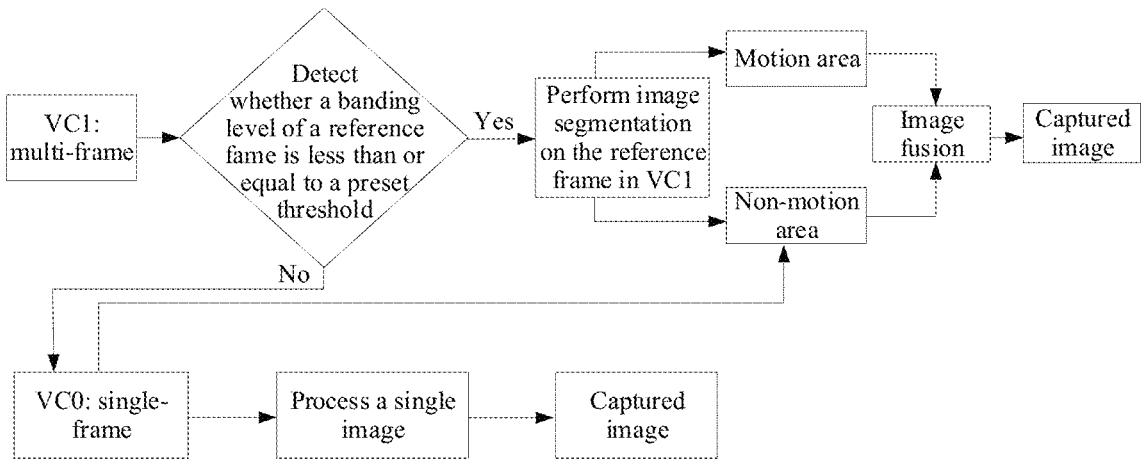
FIG. 11 is a schematic diagram of modules corresponding to a photographing method according to an embodiment of this application.

When the mobile phone is divided into modules, different modules may be called to implement the foregoing process. As shown in FIG. 11, VC1 includes a plurality of images. For example, VC1 includes one reference frame and N auxiliary frames. In this case, VC1(n) may be the reference frame, and VC1(n−1) and VC1(n+1) may be the auxiliary frames. A banding level (for example, a first threshold) of the reference frame is detected. If the first threshold is less than or equal to a preset threshold, it indicates that the banding level of the reference frame may be reduced by using a preset algorithm in the mobile phone. If the first threshold is greater than a preset threshold, it indicates that banding in the reference frame cannot be processed by using a preset algorithm in the mobile phone.

As shown in FIG. 11, when it is detected that the banding level of the reference frame is less than or equal to the preset threshold, banding in the reference frame may be reduced by using a preset de-banding algorithm in the mobile phone. The mobile phone may perform image segmentation on the reference frame in VC1. For example, the reference frame is segmented into a motion area and a non-motion area. Gamma processing is performed on the motion area of the reference frame, to reduce banding in the motion area. Image fusion is performed on the non-motion area of the reference frame and a reference frame. As distributions of banding in adjacent reference frames is different, banding fusion may reduce banding in the motion area. Image fusion is performed on a motion area obtained after banding processing and a non-motion area obtained after the image fusion, to obtain a captured image.

It may be understood that, an image frame in VC0 may be used as an auxiliary frame to process the non-motion area of the reference frame, so as to reduce a banding level of the non-motion area.

As shown in FIG. 11, when it is detected that the banding level of the reference frame is greater than the preset threshold, banding in the reference frame cannot be reduced by using a de-banding algorithm in the mobile phone. The mobile phone processes VC0 that includes one frame by using a preset deblurring algorithm, to obtain a captured image.

When the mobile phone detects whether there is a flickering illumination device providing light, a light sensor may determine the light in the photographing scene of the mobile phone. Alternatively, the mobile phone acquires at least two images through short exposure, and determines, based on the images, whether there is a flickering illumination device providing light. Generally, the mobile phone and the target object are in the same scene. Therefore, light conditions of the photographing scene can be determined by the light sensor. In some embodiments, the mobile phone is in the snapshot mode of the camera application. This mode may be used in a photographing scene with natural light and a photographing scene with a fluorescent lamp. The mobile phone may obtain users' selection of a photographing scene, to determine an exposure manner for use. Certainly, the light in the photographing scene may be determined in other manners in specific implementations, which are not illustrated one by one herein.

For example, when the mobile phone runs the camera application, the mobile phone may acquire an image with the second exposure duration. The second exposure duration indicates that the mobile phone acquires the image with a third exposure duration. The mobile phone acquires at least two images with the second exposure duration. The mobile phone calculates brightness of each of the acquired images. If a brightness difference between two of the images is greater than a preset brightness difference, it indicates that the light in the current photographing scene of the mobile phone is flickering light. If the mobile phone continuously acquires a plurality of images, the mobile phone calculates brightness of each of the images and a brightness difference between two adjacent images. If there is a brightness difference between two adjacent images greater than a preset brightness difference, it indicates that the light in the current photographing scene of the mobile phone is flickering light.

The third exposure duration may be equal to the first exposure duration, or the third exposure duration may be equal to the second exposure duration.

It should be noted that, the mobile phone determines the light in the photographing scene, and perform an exposure in an exposure manner corresponding to the light. The mobile phone is in the snapshot mode. If the mobile phone detects that a variation in intensity of light in the photographing scene exceeds a preset light variation threshold, the mobile phone may detect the light in the photographing scene again. Then, the mobile phone may determine whether to switch the exposure manner based on a result of detection on the light. For example, the light in the current photographing scene of the mobile phone is natural light, and the light is weak. the light is enhanced artificially by using a fluorescent lamp. Then, the mobile phone detects a relatively great change to intensity of light in the scene, that is, an increase in the intensity of light exceeds the preset light variation threshold. In this case, the mobile phone detects that there is a flickering illumination device (the fluorescent lamp) providing light in the current photographing scene, so that the mobile phone may switch the exposure manner. In addition, the mobile phone may also preset a detection duration. When the mobile phone is in the snapshot mode, the mobile phone determines the light in the current photographing scene once for each preset detection duration. This ensures that the exposure manner of the mobile phone can meet a current photographing requirement when the mobile phone captures an image.

Figure 12:
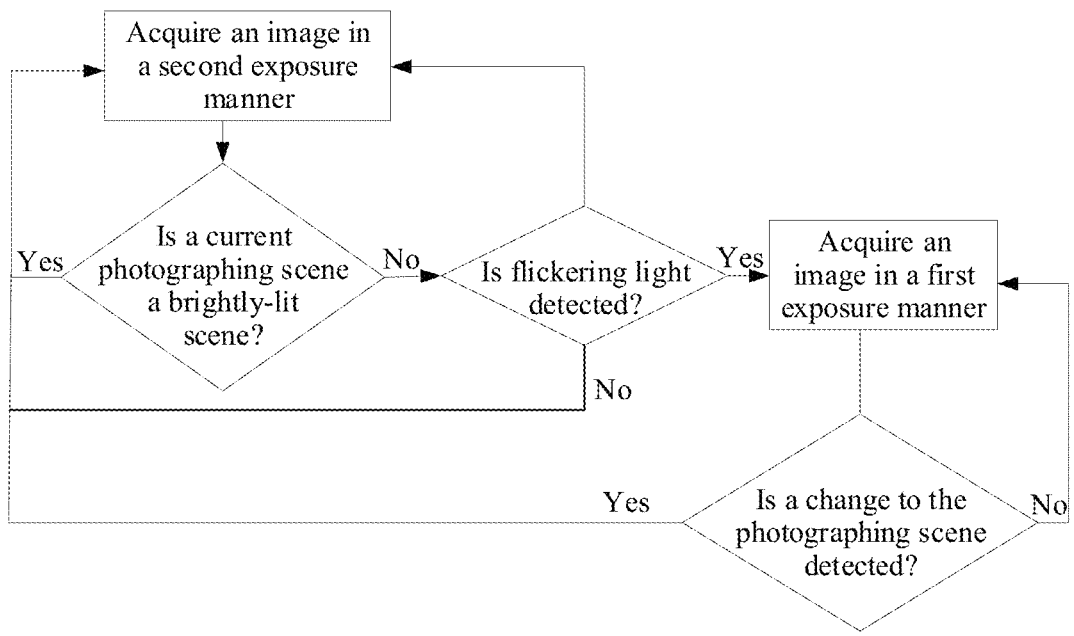
FIG. 12 is a block flowchart of a photographing method according to an embodiment of this application.

For example, when the mobile phone runs the camera application, the mobile phone may first perform an exposure in a second exposure manner. FIG. 12 shows a procedure of switching an exposure manner in the photographing method according to the embodiment of this application. As shown in FIG. 12, the mobile phone may first determine whether the current photographing scene is a brightly-lit scene. If the current photographing scene is a brightly-lit scene, the mobile phone acquires an image in the second exposure manner. If the current photographing scene is not a brightly-lit scene (for example, the photographing scene is a poorly-lit scene), the mobile phone continues detecting whether there is flickering light in the current scene. If the mobile phone determines that there is flickering light in the current photographing scene, the mobile phone acquires an image in the first exposure manner. If the mobile phone determines that there is no flickering light in the current photographing scene, the mobile phone acquires an image in the second exposure manner.

When the mobile phone is in the snapshot mode, the mobile phone may also continue detection of a change to the photographing scene. If the mobile phone detects a change to the photographing scene, the mobile phone may acquire an image in the second exposure manner. If the mobile phone does not detect a change to the photographing scene, the mobile phone continues acquiring an image in the first exposure manner.

When an exposure is performed in the first exposure manner, an image is outputted at a frame rate of 60 fps. An image corresponding to the first exposure duration of the first exposure manner is outputted at a frame rate of 30 fps. An image corresponding to the second exposure duration of the first exposure manner is outputted at a frame rate of 30 fps. When an exposure is performed in the second exposure manner with the third exposure duration, the mobile phone outputs an image corresponding to the third exposure duration at a frame rate of 30 fps.

It should be noted that, if the mobile phone determines to switch from the first exposure manner to the second exposure manner, the mobile phone may switch from the first exposure manner to the second exposure manner after a switching duration ends. For example, the switching duration is set to 5 s (s). When the mobile phone determines to switch from the first exposure duration to the second exposure duration, the mobile phone may start a switch timer. When the switch timer counts down from 5 s to zero, the mobile phone switches from the first exposure manner to the second exposure manner Likewise, if the mobile phone determines to switch from the second exposure manner to the first exposure manner, the mobile phone may change the exposure manner after the switching duration ends.

Figure 13:
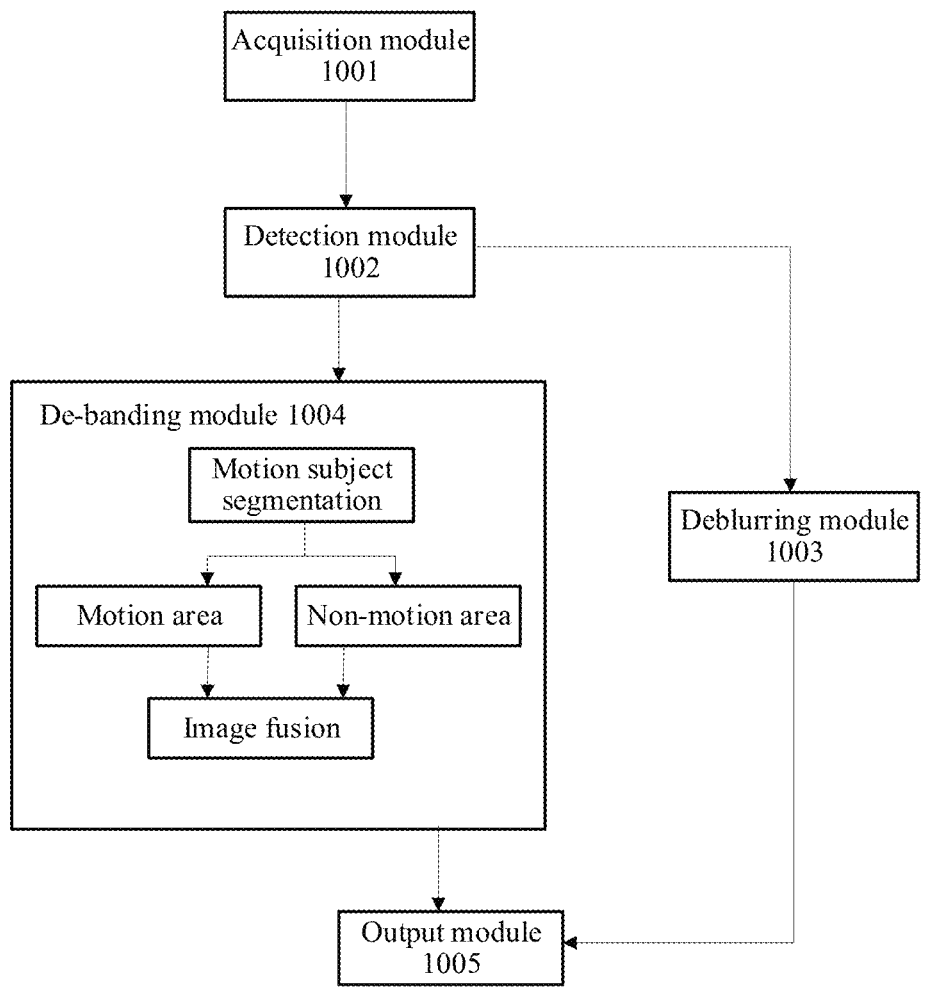
FIG. 13 is a schematic structural diagram of an electronic device according to an embodiment of this application.

For example, a mobile phone may be divided into modules, so that the mobile obtains a snapped image. As shown in FIG. 13, the mobile phone may include an acquisition module 1001, a detection module 1002, a deblurring module 1003, a de-banding module 1004, and an output module 1005. A process in which the mobile phone generates a snapped image when the mobile phone is in a snapshot mode and a capture button is triggered is used as an example for description.

The acquisition module 1001 shown in FIG. 13 is configured to acquire an image in an exposure manner corresponding to the snapshot mode. For example, the mobile phone acquires an image by performing exposures with a first exposure duration and a second exposure duration alternately. After the mobile phone receives users' trigger to the capture button, the acquisition module 1001 may transmit an acquired image to the detection module 1002. Specifically, the acquisition module 1001 may use, as a reference frame, an image acquired by the mobile phone at a moment when the capture button is triggered, and transmit at least one auxiliary frame to the detection module 1002.

The detection module 1002 may be configured to detect a banding level of the reference frame transmitted by the acquisition module 1001. If the banding level of the reference frame is less than a preset banding threshold, the detection module 1002 sends the reference frame to the deblurring module 1003. If the banding level of the reference frame is greater than or equal to a preset banding threshold, the detection module 1002 sends the reference frame and the at least one auxiliary frame to the de-banding module 1004.

The deblurring module 1003 is configured to perform deblurring on the reference frame. The deblurring module 1003 is provided with a program of a deblurring algorithm, so that the deblurring module 1003 can perform deblurring on the reference frame image. The deblurring module 1003 outputs a deblurred image to the output module 1005. In some embodiments, the deblurring module 1003 generates a snapped image after the deblurring, and transmits the snapped image to the output module.

The de-banding module 1004 is configured to perform motion subject segmentation on the reference frame. A motion subject is generally a photographed object in a snapshot scene. For example, the snapshot scene is a scene of a basketball game. Motion subjects are basketball players. After the motion subject segmentation is performed on the reference frame, the reference frame is segmented into a motion area (namely, an area where a target object is located in the image) and a non-motion area. De-banding is performed on the motion area based on the auxiliary frame. Pixel fusion is performed on the non-motion area based on an auxiliary frame in a first image stream cached by the acquisition module 1001 and the reference frame, to implement de-banding on the non-motion area. A de-banded motion area and a de-banded non-motion area are fused, to generate a de-banded image. The de-banding module 1004 transmits the de-banded image to the output module 1005. In some embodiments, the deblurring module 1003 generates a snapped image after the deblurring, and transmits the snapped image to the output module.

The auxiliary frame is an image frame adjacent to the reference frame. A timestamp of the auxiliary frame in the first image stream is closest to a timestamp of the reference frame. The de-banding module 1004 performs de-banding on the reference frame through multi-frame fusion. This can effectively reduce noise in the reference frame. The timestamp of the auxiliary frame in the first image stream is close to the timestamp of the reference frame. The first image stream is acquired with the first exposure duration, and exposure time of the auxiliary frame in the first image stream is relatively long. As a result, noise in the auxiliary frame is little. Therefore, the noise in the reference frame can be effectively reduced by using the auxiliary frame in the first image stream, and image quality can be improved.

The output module 1005 may display the snapped image on a display screen. In some embodiments, the output module 1005 may be configured to convert a format of the de-banded image, so that the display screen of the mobile phone can display the snapped image. Alternatively, the output module 1005 may convert a format of the deblurred image, so that the display screen of the mobile phone can directly display the snapped image.

It should be noted that, the foregoing segmentation is performed on an image of the reference frame by using an algorithm. In a case in which the reference frame includes a single target object, the target object may be identified to implement the motion subject segmentation. In a complex case in which a reference image includes a plurality of target objects, an optical flow method may be used to implement the motion subject segmentation.

For example, for the single target object that is a person, a pet, a vehicle, or a robot, a specific recognition algorithm may be used to identify the target object in the reference frame, to implement the motion subject segmentation on the reference frame.

For another example, the reference frame includes a plurality of target objects such as a plurality of people or a plurality of motion subjects, or the target object in the reference frame is relatively small in size. The optical flow method may be used to segment out a motion subject and a non-motion area, to implement the motion subject segmentation on the reference frame.

During the motion subject segmentation performed by using the optical flow method, the motion subject (namely, the target object) is separated from surroundings, and second processing is performed on the surroundings, thereby improving a display effect of the snapped image.

It may be understood that, the snapping method in the embodiments of this application may also be applied to high dynamic range imaging (High Dynamic Range Imaging, HDR) and recording. Exposures are performed with a first exposure duration and a second exposure duration alternately during recording of an HDR video, so that an electronic device can acquire a long frame, a medium frame, and a short frame. Video images are synthesized by using an ISP. This can improve a dynamic range of the video. Specifically, if there is a flickering illumination device in a scene during the recording of the HDR video, the electronic device may first perform de-debanding (de-banding) on an image acquired with the second exposure duration (that is, through short exposure). Then, the electronic device may perform fusion on an image stream corresponding to the first exposure duration and an image stream corresponding to the second exposure duration, to improve sharpness (sharpness) of an image in the video and definition of the video.

A de-banding algorithm can be used to generate one display image based on a plurality of images. However, a video delay may be caused during the running of the algorithm. Therefore, if it is ensured that a preview image is a real-time image in a process in which the HDR video is recorded through alternate exposure, a stored image stream may present an improved effect. Specifically, video images in a preview video are played smoothly during real-time recording. After the recording of the HDR video is finished, the electronic device obtains a recording file. The recording file is a video of high definition. In specific implementations, an asynchronous call to a multi-frame algorithm may be limited to be completed within 33 ms. This guarantees a frame rate of 30 fps for a record stream.

It may be understood that, when alternate exposure is applied to recording of an HDR video, a high-speed shutter may form short frames. This eliminates motion trails of a target object from the frames, so that sharpness of each image is increased, and definition of an overall video is improved.

It may be understood that to achieve the foregoing functions, the electronic device provided in the embodiments of this application includes corresponding hardware structures and/or software modules for performing the functions. A person skilled in the art should be easily aware that, in combination with the units and algorithm steps in the examples described in the embodiments disclosed in this specification, the embodiments of this application can be implemented by hardware or a combination of hardware and computer software. Whether a function is performed by hardware or computer software driving hardware depends on particular applications and design constraints of the technical solutions. The person skilled in the art may use different methods to implement the described functions for each particular application, but it should not be considered that the implementation goes beyond the scope of embodiments of this application.

In the embodiments of this application, the foregoing electronic device may be divided into function modules based on the foregoing method examples. For example, each function module may be obtained through division for a corresponding function, or two or more functions may be integrated into one processing module. The integrated module may be implemented in a form of hardware or a software function module. It should be noted that division into the modules in the embodiments of this application is an example, and is merely logical function division. In actual implementation, there may be another division manner.

Figure 14:
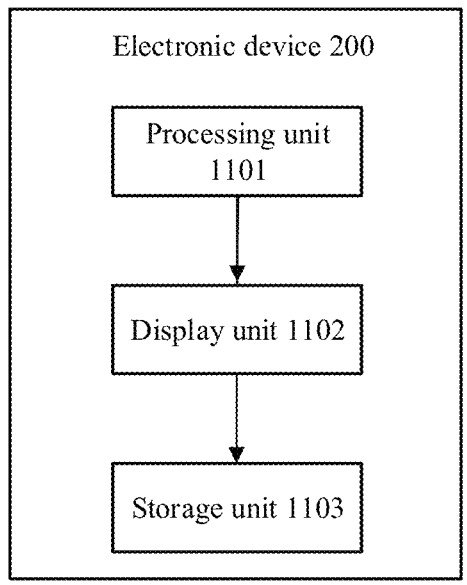
FIG. 14 is a schematic diagram of an electronic device according to an embodiment of this application.

When an integrated unit is used, FIG. 14 shows a possible structure of the electronic device in the foregoing embodiments. The electronic device 200 includes a processing unit 1101, a display unit 1102, and a storage unit 1103.

The processing unit 1101 is configured to manage an operation of the electronic device. For example, the processing unit 1101 may control an exposure manner of the electronic device in a snapshot mode. The processing unit 1101 may further control display content and the like on a display screen of the electronic device.

The display unit 1102 is configured to display an interface of the electronic device. For example, the display unit 1102 may be configured to display a main interface of the electronic device in the snapshot mode, and display a preview image and the like in the snapshot mode.

The storage unit 1103 is configured to store program code and data of the electronic device 200. For example, when the electronic device is in the snapshot mode, the storage unit 1103 may cache the preview image of the electronic device. The storage unit 1103 is further configured to store an image processing algorithm and the like of the snapshot mode.

Certainly, a unit module in the electronic device 200 includes, but is not limited to, the processing unit 1101, the display unit 1102, and the storage unit 1103. For example, the electronic device 200 may further include a sensor unit and a communication unit. The sensor unit may include a light sensor, configured to acquire intensity of light in the scene where the electronic device is located. The communication unit is configured to support communication between the electronic device 200 and another apparatus.

The processing unit 1101 may be a processor or a controller, for example, a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or a combination thereof. The processor may include an application processor and a baseband processor. The processor can implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The storage unit 1103 may be a memory. An audio unit may include a microphone, a speaker, a receiver, and the like. The communication unit may be a transceiver, a transceiver circuit, a communication interface, or the like.

For example, the processing unit 1101 is a processor (the processor 210 shown in FIG. 4). The display unit 1102 may be a display screen (the display screen 294 shown in FIG. 4=, which may be a touchscreen with a display panel and a touch panel integrated). The storage unit 1103 may be a memory (the internal memory 221 shown in FIG. 4).

Figure 15:
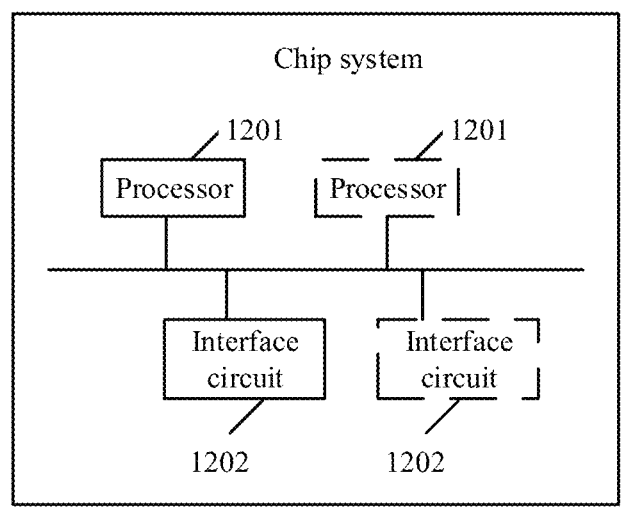
FIG. 15 is a schematic structural diagram of a chip system according to an embodiment of this application.

An embodiment of this application further provides a chip system. As shown in FIG. 15, the chip system includes at least one processor 1201 and at least one interface circuit 1202. The processor 1201 and the interface circuit 1202 may be connected through a line. For example, the interface circuit 1202 may be configured to receive a signal from another apparatus (for example, a memory of the electronic device). For another example, the interface circuit 1202 may be configured to send a signal to another apparatus (for example, the processor 1201). For example, the interface circuit 1202 may read instructions stored in the memory and send the instructions to the processor 1201. When the instructions are executed by the processor 1201, the electronic device is enabled to perform the steps in the foregoing embodiments. Certainly, the chip system may further include other discrete components. This is not specifically limited in the embodiments of this application.

An embodiment of this application further provides a computer storage medium. The computer storage medium includes computer instructions. When the computer instructions are run on the foregoing electronic device, the electronic device is enabled to perform the functions or steps performed by the mobile phone in the foregoing method embodiments.

An embodiment of this application further provides a computer program product. When the computer program product runs on a computer, the computer is enabled to perform the functions or steps performed by the mobile phone in the foregoing method embodiments.

The foregoing descriptions about implementations allow a person skilled in the art to clearly understand that, for the purpose of convenient and brief description, division into the foregoing function modules is merely used as an example for description. In actual application, the foregoing functions can be allocated to and completed by different function modules according to a requirement. That is, an internal structure of an apparatus is divided into different function modules to implement all or some of the functions described above.

In the several embodiments provided in this application, it should be understood that the disclosed apparatus and method may be implemented in another manner. For example, the foregoing apparatus embodiments are merely examples. For example, division into the modules or the units is merely logical function division and may be other division in actual implementation. For example, a plurality of units or components may be combined or integrated into another apparatus, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated. A part displayed as a unit may be one physical unit or a plurality of physical units, and may be located in one place, or may be distributed to different places. Some or all of the units may be selected according to actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and is sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, a compact disc, or the like.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A photographing method, applied to an electronic device, wherein an illumination device provides light in a photographing scene of the electronic device, the illumination device provides flickering light, and a duration for which the illumination device flickers once is a flickering duration; and the method comprises:
running, by the electronic device, a camera application, and determining, by the electronic device, that the light in the photographing scene is flickering light;
acquiring, by the electronic device, an image in a first exposure manner, wherein the first exposure manner indicates that the electronic device performs exposures with a first exposure duration and a second exposure duration alternately and generates a first photographing queue and a second photographing queue, the first photographing queue comprises at least one first image, the second photographing queue comprises at least one second image, the first photographing queue is an image acquired by the electronic device with the first exposure duration, the second photographing queue is an image acquired by the electronic device with the second exposure duration, the first exposure duration is greater than the flickering duration, and the second exposure duration is less than the flickering duration;
displaying, by the electronic device, a photographing interface, wherein the photographing interface comprises a preview image and a capture button, and the preview image is generated based on the first photographing queue; and
in response to a trigger to the capture button, generating, by the electronic device, a captured image based on the at least one first image and the at least one second image, and displaying the captured image.

2. The method according to claim 1, wherein the first exposure duration is an integer multiple of the flickering duration, the at least one first image acquired by the electronic device with the first exposure duration constitutes the first photographing queue, exposure durations of the first images of the at least one first image in the first photographing queue correspond to a same quantity of flickering times, and a difference between brightness values of the first images in the first photographing queue is less than a preset brightness threshold, so that display brightness of the preview image is even.

3. The method according to claim 1, wherein the method further comprises: when the electronic device acquires the image in the first exposure manner, acquiring, by the electronic device, the image at a first frequency; and the acquiring, by the electronic device, the image at the first frequency comprises:
acquiring, by the electronic device, the image in the first photographing queue at a second frequency, and acquiring, by the electronic device, the image in the second photographing queue at a third frequency, wherein a sum of the second frequency and the third frequency is equal to the first frequency.

4. The method according to claim 1, wherein the generating the captured image based on the at least one first image and the at least one second image comprises:
determining, by the electronic device, a moment at which the capture button is triggered as a shutter moment;
determining, by the electronic device, the at least one first image of which image acquisition time is close to the shutter moment in the first photographing queue;

using, as a reference frame, an image with a highest brightness among the at least one first image;

determining, by the electronic device, the at least one second image, of which image acquisition time is close to acquisition time of the reference frame, in the second photographing queue; and using the at least one second image as an auxiliary frame, and generating the captured image based on the reference frame and the auxiliary frame.

5. The method according to claim 4, wherein the generating the captured image based on the reference frame and the auxiliary frame comprises:

determining a first threshold of the reference frame based on banding detection, wherein the first threshold indicates a banding level of the reference frame; and generating, if the first threshold is greater than a preset threshold, the captured image based on the auxiliary frame; or generating, if the first threshold is less than or equal to the preset threshold, the captured image based on the reference frame and the auxiliary frame.

6. The method according to claim 5, wherein the generating, if the first threshold is less than or equal to the preset threshold, the captured image based on the reference frame and the auxiliary frame comprises:

determining a non-motion area and a motion area in the reference frame, wherein the non-motion area is a part of the image in which a motionless object is located, and the motion area is a part of the image in which a target object is located;

performing pixel fusion on the non-motion area based on the auxiliary frame to reduce banding in the non-motion area, and generating a processed non-motion area;

adjusting a gray level coefficient of the motion area to reduce banding in the motion area, and generating a processed motion area; and fusing, by using an image fusion algorithm, the processed motion area and the processed non-motion area to generate the captured image.

7. The method according to claim 5, wherein the generating, if the first threshold is greater than the preset threshold, the captured image based on the auxiliary frame comprises:

processing, by using a preset image deblurring algorithm, the auxiliary frame to reduce motion blur of the auxiliary frame and generate the captured image.

8. The method according to claim 1, wherein the generating the captured image based on the at least one first image and the at least one second image comprises:

determining, by the electronic device, a moment at which the capture button is triggered as a shutter moment;

determining, by the electronic device, the at least one first image of which image acquisition time is close to the shutter moment in the first photographing queue;

using, as a reference frame, an image with a highest brightness among the at least one first image;

determining, by the electronic device, the at least one second image, of which image acquisition time is close to acquisition time of the reference frame, in the second photographing queue; and determining, by the electronic device, an image with the highest brightness among the at least one second image as an auxiliary frame, and generating the captured image based on the reference frame and the auxiliary frame.

9. The method according to claim 1, wherein the running, by the electronic device, the camera application, and determining, by the electronic device, that the light in the photographing scene is flickering light comprises:

running, by the electronic device, the camera application, and acquiring, by the electronic device, an image in a second exposure manner, wherein the second exposure manner indicates that the electronic device performs an exposure with a third exposure duration;

continuously acquiring, by the electronic device, a plurality of images, and calculating brightness of each of the plurality of images; and if a brightness difference between every two of the plurality of images is greater than a preset brightness difference, determining that the light in the photographing scene is flickering light.

10. The method according to claim 9, wherein the third exposure duration is equal to the first exposure duration or the second exposure duration.

11. The method according to claim 1, wherein the method further comprises:

if the electronic device detects a change to the photographing scene, acquiring, by the electronic device, an image in a second exposure manner, wherein the second exposure manner indicates that the electronic device performs an exposure with a third exposure duration.

12. The method according to claim 11, wherein after the electronic device detects the change to the photographing scene, the method further comprises:

determining, by the electronic device, a switching delay that is associated with switching between exposure manners; and switching, by the electronic device after the switching delay ends, from the first exposure manner to the second exposure manner.

13. An electronic device, comprising:

a camera, configured to acquire an image;

a display screen, configured to display an interface;

one or more processors;

a memory; and one or more computer programs, wherein the one or more computer programs are stored in the memory, the one or more computer programs comprise instructions, and when the instructions are executed by the electronic device, the electronic device is enabled to perform a photographing method, and wherein an illumination device provides flickering light in a photographing scene of the electronic device, and a duration for which the illumination device flickers once is a flickering duration, the method comprising:

running a camera application and determining that the light in the photographing scene is flickering light;

acquiring an image in a first exposure manner, wherein the first exposure manner indicates that the electronic device performs exposures with a first exposure duration and a second exposure duration alternately and generates a first photographing queue and a second photographing queue, the first photographing queue comprises at least one first image, the second photographing queue comprises at least one second image, the first photographing queue is an image acquired by the electronic device with the first exposure duration, the second photographing queue is an image acquired by the electronic device with the second exposure duration, the first exposure duration is greater than the flickering duration, and the second exposure duration is less than the flickering duration;

displaying a photographing interface, wherein the photographing interface comprises a preview image and a capture button, and the preview image is generated based on the first photographing queue; and in response to a trigger to the capture button, generating a captured image based on the at least one first image and the at least one second image, and displaying the captured image.

14. The electronic device according to claim 13, wherein the first exposure duration is an integer multiple of the flickering duration, the at least one first image acquired by the electronic device with the first exposure duration constitutes the first photographing queue, exposure durations of first images of the at least one first image in the first photographing queue correspond to a same quantity of flickering times, and a difference between brightness values of the first images in the first photographing queue is less than a preset brightness threshold, so that display brightness of the preview image is even.

15. The electronic device according to claim 13, wherein the method further comprises: when the electronic device acquires the image in the first exposure manner, acquiring the image at a first frequency; and the acquiring the image at the first frequency comprises:
acquiring the image in the first photographing queue at a second frequency, and
acquiring the image in the second photographing queue at a third frequency, wherein a sum of the second frequency and the third frequency is equal to the first frequency.

16. The electronic device according to claim 13, wherein the generating the captured image based on the at least one first image and the at least one second image comprises:
determining a moment at which the capture button is triggered as a shutter moment;
determining at least one first image of which image acquisition time is close to the shutter moment in the first photographing queue;
using, as a reference frame, an image with a highest brightness among the at least one first image;
determining at least one second image, of which image acquisition time is close to acquisition time of the reference frame, in the second photographing queue; and
using the at least one second image as an auxiliary frame, and generating the captured image based on the reference frame and the auxiliary frame.

17. The electronic device according to claim 16, wherein the generating the captured image based on the reference frame and the auxiliary frame comprises:
determining a first threshold of the reference frame based on banding detection, wherein the first threshold indicates a banding level of the reference frame; and
generating, if the first threshold is greater than a preset threshold, the captured image based on the auxiliary frame; or
generating, if the first threshold is less than or equal to the preset threshold, the captured image based on the reference frame and the auxiliary frame.

18. The electronic device according to claim 17, wherein the generating, if the first threshold is less than or equal to the preset threshold, the captured image based on the reference frame and the auxiliary frame comprises:
determining a non-motion area and a motion area in the reference frame, wherein the non-motion area is a part of the image in which a motionless object is located, and the motion area is a part of the image, in which a target object is located;
performing pixel fusion on the non-motion area based on the auxiliary frame to reduce banding in the non-motion area, and generating a processed non-motion area;
adjusting a gray level coefficient of the motion area to reduce banding in the motion area, and generating a processed motion area; and
fusing, by using an image fusion algorithm, the processed motion area and the processed non-motion area to generate the captured image.

19. The electronic device according to claim 13, wherein the generating the captured image based on the at least one first image and the at least one second image comprises:
determining a moment at which the capture button is triggered as a shutter moment;
determining at least one first image of which image acquisition time is close to the shutter moment in the first photographing queue;
using, as a reference frame, an image with a highest brightness among the at least one first image;
determining at least one second image, of which image acquisition time is close to acquisition time of the reference frame, in the second photographing queue; and
determining an image with the highest brightness among the at least one second image as an auxiliary frame, and generating the captured image based on the reference frame and the auxiliary frame.

20. A non-transitory computer-readable storage medium, comprising computer instructions, wherein when the computer instructions are run on a computer, the computer is enabled to perform a photographing method, and wherein an illumination device provides flickering light in a photographing scene associated with the photographing method, and a duration for which the illumination device flickers once is a flickering duration, the method comprising:
running a camera application and determining that the light in the photographing scene is flickering light;
acquiring an image in a first exposure manner, wherein the first exposure manner indicates that an electronic device performs exposures with a first exposure duration and a second exposure duration alternately and generates a first photographing queue and a second photographing queue, the first photographing queue comprises at least one first image, the second photographing queue comprises at least one second image, the first photographing queue is an image acquired by the electronic device with the first exposure duration, the second photographing queue is an image acquired by the electronic device with the second exposure duration, the first exposure duration is greater than the flickering duration, and the second exposure duration is less than the flickering duration;
displaying a photographing interface, wherein the photographing interface comprises a preview image and a capture button, and the preview image is generated based on the first photographing queue; and
in response to a trigger to the capture button, generating a captured image based on the at least one first image and the at least one second image, and displaying the captured image.

* * * * *